United States Patent
Raj et al.

(10) Patent No.: US 12,276,963 B2
(45) Date of Patent: Apr. 15, 2025

(54) APPARATUS, SYSTEM, AND METHOD OF FUNCTIONAL SAFETY

(71) Applicant: Intel Corporation, Santa Clara, CA (US)

(72) Inventors: Darshan Raj, Baden Wuerttemberg (DE); Michael Schmidt, Remchingen (DE); Serdar Gueltekin, Pforzheim (DE)

(73) Assignee: INTEL CORPORATION, Santa Clara, CA (US)

( * ) Notice: Subject to any disclaimer, the term of this patent is extended or adjusted under 35 U.S.C. 154(b) by 368 days.

(21) Appl. No.: 17/710,755

(22) Filed: Mar. 31, 2022

(65) Prior Publication Data

US 2022/0221837 A1    Jul. 14, 2022

(51) Int. Cl.
   *G05B 19/4063*   (2006.01)
   *G05B 19/418*    (2006.01)

(52) U.S. Cl.
   CPC ... *G05B 19/4063* (2013.01); *G05B 19/41895* (2013.01)

(58) Field of Classification Search
   CPC .......... G05B 19/4063; G05B 19/41895; B25J 9/1674
   See application file for complete search history.

(56) References Cited

U.S. PATENT DOCUMENTS

| | | | |
|---|---|---|---|
| 2017/0094554 A1* | 3/2017 | Liu | H04W 8/005 |
| 2019/0228160 A1* | 7/2019 | Hunsaker | G05B 19/0428 |
| 2022/0161433 A1* | 5/2022 | Beck | B25J 9/1674 |

* cited by examiner

Primary Examiner — Yuhui R Pan
(74) Attorney, Agent, or Firm — Shichrur & Co.

(57) ABSTRACT

For example, an apparatus may include a motherboard including a functional processing core configured to perform a functionality having a Functional Safety (FuSa) level; a FuSa transceiver configured to communicate with an external safety-island processor, which is external to the motherboard; and a FuSa controller configured to establish a FuSa connection with the external safety-island processor according to the FuSa level, to send FuSa information corresponding to the functionality of the functional processing core to the external safety-island processor via the FuSa transceiver, and to control one or more FuSa operations of the functional processing core based on one or more control messages received from the external safety-island processor via the FuSa transceiver.

22 Claims, 11 Drawing Sheets

APPARATUS, SYSTEM, AND METHOD OF FUNCTIONAL SAFETY

TECHNICAL FIELD

Aspects described herein generally relate to functional safety.

BACKGROUND

Autonomous systems, such as, for example, vehicular systems, robotic systems, industrial systems, may be configured to perform a certain functionality, e.g., in a manufacturing line, and/or the like.

There may be a need to provide a technical solution to support Functional Safety (FuSa) procedures to maintain a desired FuSa level associated with the functionality of an autonomous system.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
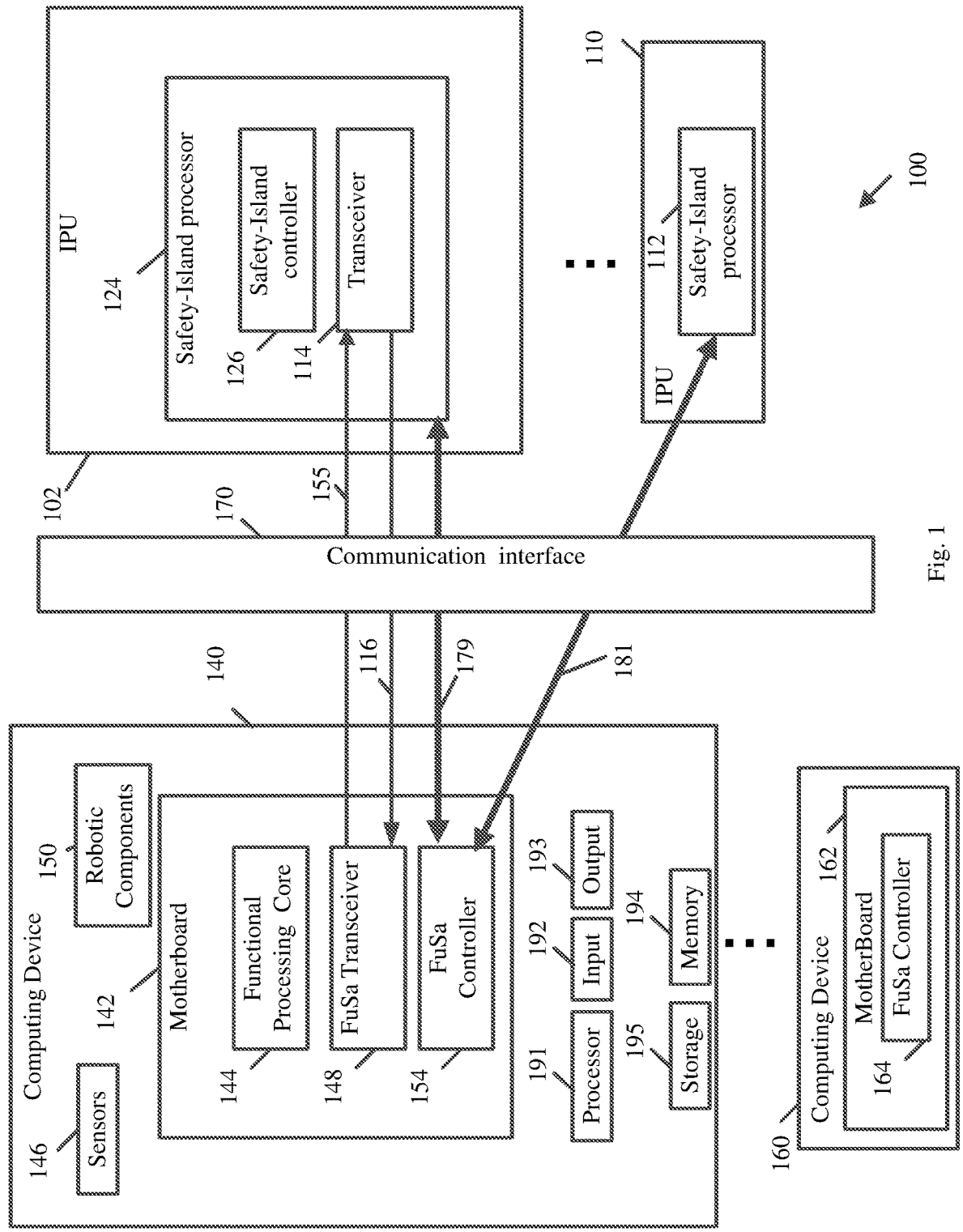
FIG. 1 is a schematic block diagram illustration of a system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

The words "exemplary" and "demonstrative" are used herein to mean "serving as an example, instance, demonstration, or illustration". Any aspect, aspect, or design described herein as "exemplary" or "demonstrative" is not necessarily to be construed as preferred or advantageous over other aspects, aspects, or designs.

References to "one aspect", "an aspect", "demonstrative aspect", "various aspects", "one embodiment", "an embodiment", "demonstrative embodiment", "various embodiments" etc., indicate that the aspect(s) and/or embodiments so described may include a particular feature, structure, or characteristic, but not every aspect or aspect necessarily includes the particular feature, structure, or characteristic. Further, repeated use of the phrase "in one aspect" "or" in one embodiment" does not necessarily refer to the same aspect or embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The phrases "at least one" and "one or more" may be understood to include a numerical quantity greater than or equal to one, e.g., one, two, three, four, [ . . . ], etc. The phrase "at least one of" with regard to a group of elements may be used herein to mean at least one element from the group consisting of the elements. For example, the phrase "at least one of" with regard to a group of elements may be used herein to mean one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and/ or may represent any information as understood in the art.

The terms "processor" or "controller" may be understood to include any kind of technological entity that allows handling of any suitable type of data and/or information. The data and/or information may be handled according to one or more specific functions executed by the processor or controller. Further, a processor or a controller may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), and the like, or any combination thereof. Any other kind of implementation of the respective functions, which will be described below in further detail, may also be understood as a processor, controller, or logic circuit. It is understood that any two (or more) processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" is understood as a computer-readable medium (e.g., a non-transitory computer-readable medium) in which data or information can be stored for retrieval. References to "memory" may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" may be used to refer to any type of executable instruction and/or logic, including firmware.

Some aspects may be used in conjunction with various devices and systems, for example, an autonomous device, an autonomous platform, an autonomous system, an autonomous robot, a robotic device, a robotic system, an autonomous vehicle, a server device, a cloud server, an industrial device, an industrial system, an industrial platform, any suitable device and/or system of process automation and/or discrete automation, and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., controller circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

Reference is made to FIG. 1, which schematically illustrates a system 100, in accordance with some demonstrative aspects.

In some demonstrative aspects, system 100 may include an industrial system, a robotic system, an autonomous system, any suitable device and/or system of process automation and/or discrete automation, e.g., mining, oil refinery, machine building, and/or energy management, and/or the like.

In one example, system 100 may include an industrial robotic system, for example, Industrial Discrete Automation, e.g., including one or more Robot Arms, Autonomous Mobile Robots (AMRs), and/or the like.

In another example, system 100 may include a mobile robot system, for example, an AMR, and/or the like.

In another example, system 100 may include a vehicular system, e.g., for example, an Autonomous Guided Vehicle (AGV), a vehicular/driver assistance system, and/or the like.

In another example, system 100 may include a control system, for example, a Distributed Control Unit (DCU) system, or the like.

In another example, system 100 may include any other system.

In some demonstrative aspects, system 100 may include a computing device 140, e.g., as described below.

In some demonstrative aspects, computing device 102 may include, for example, a computing platform, an Industrial PC (IPC), a PC, a desktop computer, a mobile computer, a server computer, or the like.

In some demonstrative aspects, computing device 140 may include, for example, one or more of a processor 191, an input unit 192, an output unit 193, a memory unit 194, and/or a storage unit 195. Device 140 may optionally include other suitable hardware components and/or software components. In some demonstrative aspects, some or all of the components of one or more of device 140 may be enclosed in a common housing or packaging, and may be interconnected or operably associated using one or more wired or wireless links. In other aspects, components of one or more of device 140 may be distributed among multiple or separate devices.

In some demonstrative aspects, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 140 and/or of one or more suitable applications.

In some demonstrative aspects, input unit 192 may include, for example, a keyboard, a keypad, a mouse, a touch-screen, a touch-pad, a track-ball, a stylus, a microphone, a pointing device, a camera, a sensor, or other suitable input device. Output unit 193 may include, for example, a display, a screen, a touch-screen, one or more audio speakers or earphones, and/or other suitable output devices.

In some demonstrative aspects, memory unit 194 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 may include, for example, a hard disk drive, a disk drive, a solid-state drive (SSD), and/or other suitable removable or non-removable storage units. Memory unit 194, for example, may store data processed by device 140.

In some demonstrative aspects, computing device 140 may be configured to perform one or more functionalities, e.g., as described below.

In some demonstrative aspects, computing device 140 may include a motherboard (MB) 142, for example, a Printed Circuit Board (PCB), e.g., as described below.

In some demonstrative aspects, motherboard 142 may include at least one functional processing core 144, for example, as a System On Chip (SoC), and/or any other processing core, e.g., as described below.

In one example, the SoC may include an integrated circuit, for example, a chip. For example, the chip or SoC may be configured to perform one or more functionalities of functional processing core 144. For example, the chip or SoC may include one or more elements of functional processing core 144.

In some demonstrative aspects, functional processing core 144 may be configured to perform a functionality having a Functional Safety (FuSa) level.

In some demonstrative aspects, the functionality may include performing one or more tasks, e.g., as described below.

In some demonstrative aspects, the one or more tasks may include one or more industrial tasks, manufacturing tasks, autonomous tasks, and/or the like.

In some demonstrative aspects, computing device 140 may be implemented, for example, in a factory for handling one or more objects, which may be, for example, a part that should be affixed to a product that is being manufactured, objects to be classified in a manufacturing line, and/or any other objects.

In some demonstrative aspects, the FuSa level of the functionality may include a level of safety required to perform the industrial and/or the manufacturing tasks.

In some demonstrative aspects, the one or more tasks may include one or more vehicular tasks, driver assistance tasks, and/or the like.

In some demonstrative aspects, computing device 140 may be implemented, for example, in a vehicle, and may be configured to perform one or more vehicular and/or driver tasks, e.g., tasks for controlling vehicle/driver assisted systems.

In some demonstrative aspects, the FuSa level may include a level of safety required to perform the one or more vehicular and/or driver tasks.

In other aspects, the functional processing core 144 may be configured to perform any other additional or alternative tasks having any other FuSa level.

In some demonstrative aspects, autonomous device 140 may include one or more sensors 146 configured to provide sensing information to the functional processing core 144, for example, to control the one or more tasks performed by computing device 140.

In some demonstrative aspects, sensors 146 may include image sensors, e.g., a camera, movement sensors, acceleration sensors, acoustic sensors, e.g., microphones, and/or any other sensors.

In some demonstrative aspects, computing device 140 may include one or more robotic components 150, e.g., as described below.

In some demonstrative aspects, robotic components 150 may include robotic arms, robotic actuators, robotic motors, and/or the like.

In some demonstrative aspects, a robot arm may include a plurality of movable members, which may be movable by actuation of associated motors. For example, the robot arm may allow physical interaction with an environment to carry out a task, e.g., handling the one or more objects.

In some demonstrative aspects, a robot arm may include a plurality of joint elements, which may connect, for example, the movable members with each other. For example, a joint element may have one or more joints, each of which may provide rotatable motion, e.g., rotational motion, and/or translatory motion, e.g., displacement, to associated members and/or motion of members relative to each other.

In some demonstrative aspects, the movement of the movable members may be initiated by suitable actuators.

In some demonstrative aspects, an actuator may include a component adapted to affect a mechanism or process in response to being driven. The actuator can respond to commands given by functional processing core 144, for example, by performing mechanical movement. For example, an actuator, typically a motor (or electromechanical converter), may be configured to convert electrical energy into mechanical energy when it is activated (i.e. actuated).

In some demonstrative aspects, the functional processing core 144 may be configured to implement interaction with the environment, e.g., by controlling the one or more actuators, according to a control program, for example, in order to control the one or more robot arms, for example, according to a task to be performed.

In some demonstrative aspects, there may be a need to monitor the FuSa level of functional processing core 144, for example, to enable a proper and a safe operation of the one or more tasks of computing device 140.

In some demonstrative aspects, for example, in some use cases, scenarios, and/or implementations, there may be a need to address one or more technical issues for monitoring a FuSa level of a functional processing core, e.g., as described below.

In one example, some techniques to monitor the FuSa level may provide a fixed mapping between a monitoring entity and monitored cores, e.g., a fixed 1:1 or 1:2 mapping, for example, without a flexibility to assign functional safety, e.g., on demand.

In another example, some to monitor the FuSa level may be static and/or fixed to a specific silicon family/revision, which may prevent reuse and/or scalability.

In another example, some techniques to monitor the FuSa level may require special connectors and/or unique board designs, which may not be scalable. Therefore, such techniques may increase a cost, e.g., for Original Equipment Manufacturers (OEMs) and/or Original Design Manufacturers (ODMs).

In another example, some techniques to monitor the FuSa level may utilize fixed function solutions, which may prevent integration and/or collaboration with other connectivity solutions in a system.

In some demonstrative aspects, for example, in some use cases, scenarios, and/or implementations, there may be a need to address one or more technical issues of implementations utilizing an SoC Internal Safety-Island (SI) (ISI) to monitor a FuSa level of a functional processing core, e.g., as described below.

For example, the SoC ISI may offer a full-fledged SoC FuSa solution, which may be implemented on a same SoC as the functional processing core. The SoC ISI may provide a necessary health check of the SoC and/or may monitor an integrity of the compute, for example, through On-Demand Cross Comparison (ODCC).

In one example, the SoC ISI may be tightly coupled to the SoC resulting in a static and fixed solution, which may not allow scalability, connectivity and/or collaboration with other connectivity solutions, and/or may require unique SoC designs.

In some demonstrative aspects, for example, in some use cases, scenarios, and/or implementations, there may be a need to address one or more technical issues of techniques implementing an MB ISI to monitor a FuSa level of a functional processing core, e.g., as described below.

In one example, the MB ISI may be implemented on a same MB or PCB as the functional processing core, e.g., but not on the same SoC. For example, the MB ISI may be placed close to the Host/SoC akin to extract out the MB ISI into the PCB.

In one example, an MB ISI implementation on the same MB as the functional processing core may be static and/or may have fixed function solutions.

In another example, an MB ISI implementation on the same MB as the functional processing core may require redesign of IPCs, for example, to accommodate onboard SI on the PCB.

In another example, an MB ISI implementation on the same MB as the functional processing core may require maintaining and designing two different IPCs, e.g., one designed for FuSa implementations including the MB ISI, and another designed for non-FuSa implementations without the MB ISI.

In another example, implementing an MB ISI, e.g., instead of an SoC ISI, may require to redesign an IO layout, e.g., from an SoC ISI implementation to an MB ISI implementation, for example, every family and/or generation of SoCs.

For example, in many cases, an MB ISI implementation may require significant work on the OEMs/ODMs to redesign boards, for example, to accommodate all IOs and/or a specific FPGA or a micro-controller equivalent SI. Additionally, the MB ISI implementations may be tightly coupled to silicon Stock Keeping Units (SKUs) and families as the signals and information would vary from one to another.

In another example, an MB ISI implementation may be static and/or may require additional board design for a non-FuSa use case. Accordingly, an increased engineering cost may be invested in design, which may make the MB ISI implementation highly expensive.

In another example, it may be highly expensive to replace/redesign high cost, high compute, units in an MB ISI implementation, for example, to address if new customer requirement for safety.

In some demonstrative aspects, system 100 may include a safety-island processor (also referred to as "external safety processor") 124, which may be external to motherboard 142, e.g., as described below.

In some demonstrative aspects, safety-island processor 124 may be configured to monitor the FuSa level of functional processing core 144, e.g., as described below.

In some demonstrative aspects, safety-island processor 124 may be implemented, for example, to support a technical solution to enable proper and/or safe operation of computing device 140, e.g., as described below.

In some demonstrative aspects, safety-island processor 124 may be implemented by, and/or as part of, an Infrastructure Processing Unit (IPU) 102 (also referred to as "safety-island IPU (SI-IPU)"), e.g., as described below.

In one example, an IPU, e.g., IPU 102, may be designed to offload and/or accelerate safety, storage virtualization, network virtualization and/or security solutions. For example, an IPU may be used to offload CPU tasks, which may be performed better elsewhere. For example, the IPU may enable flexible workload placement. For example, an IPU may be used to offload data processing, e.g., a Data Processing Units (DPUs). For example, IPUs may enhance an overall value of a system.

In some demonstrative aspects, IPU 102 may be external to motherboard 142, e.g., as described below.

In some demonstrative aspects, implementing system 100 including safety-island processor 124, which is external to motherboard 142, may provide a technical solution, for example, to support provisioning functional safety on-demand, for example, for high availability, clustered, control system architectures, e.g., as described below.

In some demonstrative aspects, implementing system 100 including safety-island processor 124, which is external to motherboard 142, may provide a technical solution, for example, to support deployment of functional safety on a need basis, for example, even on a generic/common platform, e.g., as described below.

In some demonstrative aspects, implementing system 100 including safety-island processor 124, which is external to motherboard 142, may provide a technical solution, for example, to support a generic interface solution, which may be deployable across various SoCs/processors and/or relevant to current and/or future connectivity interfaces, e.g., as described below.

In some demonstrative aspects, implementing system 100 including safety-island processor 124, which is external to motherboard 142, may provide a technical solution, for example, to support establishment of an open, generic, and/or reusable interface for communication between a Host CPU, e.g., functional processing core 144, and a safety controller, e.g., safety-island processor 124, e.g., as described below.

In some demonstrative aspects, implementing system 100 including safety-island processor 124, which is external to motherboard 142, may provide a technical solution, for example, to support implementation of a Safety-Controller/Safety-Island as an IPU, e.g., IPU 102, which may allot safety-services to an operations controller, e.g., functional processing core 144, for example, on a need basis and/or on demand, e.g., as described below.

In some demonstrative aspects, implementing system 100 including safety-island processor 124, which is external to motherboard 142, may provide a technical solution, for example, to support deployment of additional safety needs, e.g., to scale, provision, and/or to cater to safety needs of one or more operation controllers, e.g., one or more functional processing cores 144, e.g., as described below.

In some demonstrative aspects, implementing system 100 including safety-island processor 124, which is external to motherboard 142, may provide a technical solution, for example, to support an open, generic, and/or reusable interface, which may reduce an engineering cost for OEMs and ODMs, and/or may allow an easy transition from one family/generation of SoCs to another, e.g., as described below.

In some demonstrative aspects, implementing system 100 including safety-island processor 124, which is external to motherboard 142, may provide a technical solution, which may be generic, and/or reusable, for example, to allow deployment over various systems. For example, system 100 may be deployed in Industrial Discrete Automation systems, e.g., robot arms, AMRs, AGVs, DCUs in process automation use cases, and/or in any other additional or alternative control systems that require functional safety, e.g., as described below In some demonstrative aspects, implementing system 100 including safety-island processor 124, which is external to motherboard 142, may provide a technical solution, for example, to support FuSa as a value-added service in a form of an IPU, for example, IPU 102, e.g., as described below.

In some demonstrative aspects, implementing system 100 including safety-island processor 124, which is external to motherboard 142, may provide a technical solution, for example, to support deploying, scaling and/or provisioning of functional safety on demand, e.g., as described below.

In some demonstrative aspects, implementing system 100 including safety-island processor 124, which is external to motherboard 142, may provide a technical solution, which may be used with various generic board designs, e.g., as described below.

In some demonstrative aspects, implementing system 100 including safety-island processor 124, which is external to motherboard 142, may provide a technical solution, for example, to support upgrading safety of existing systems, e.g., dynamically, from non-safe to safe, for example, even during a regular lifecycle, e.g., as described below.

In some demonstrative aspects, implementing system 100 including safety-island processor 124, which is external to motherboard 142, may provide a technical solution, for example, to support upgrading a safety integrity level of an entire system, for example, by replacing an IPU, e.g., with future safety enhancements in IPU designs, e.g., as described below.

In some demonstrative aspects, implementing system 100 including safety-island processor 124, which is external to motherboard 142, may provide a technical solution to revisit an MB ISI implementation to a pluggable and/or scalable architecture, and/or to visualize the safety-island as an on-demand infrastructure, e.g., as described below.

In some demonstrative aspects, motherboard 142 may include a FuSa transceiver 148 configured to communicate with an external safety-island processor, which is external to the motherboard 142, for example, safety-island processor 124, e.g., as described below.

In some demonstrative aspects, FuSa transceiver 148 may include a serializer/de-serializer configured to serialize a plurality of transmitted streams into a transmitted serial transmission, and/or to de-serialize a received serialized transmission into a plurality of received streams, e.g., as described below.

In other aspects, FuSa transceiver 148 may include any other additional or alternative type of transceiver.

In some demonstrative aspects, motherboard 142 may include a FuSa controller 154, e.g., as described below.

In some demonstrative aspects, FuSa controller 154 may be configured to control one or more FuSa operations of the functional processing core, e.g., as described below.

In some demonstrative aspects, FuSa controller 154 may include, or may be implemented, partially or entirely, by circuitry and/or logic, e.g., one or more processors including circuitry and/or logic, memory circuitry and/or logic, and/or any other circuitry and/or logic, configured to perform the functionality of FuSa controller 154. Additionally or alternatively, one or more functionalities of FuSa controller 154 may be implemented by logic, which may be executed by a machine and/or one or more processors, e.g., as described below.

In one example, FuSa controller 154 may include circuitry and/or logic, for example, one or more processors including circuitry and/or logic, to cause, trigger and/or control motherboard 142, to perform one or more operations, communications and/or functionalities, e.g., as described herein. In one example, FuSa controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, FuSa controller 154 may be configured to establish a FuSa connection with the external safety-island processor 124, e.g., as described below.

In some demonstrative aspects, FuSa controller 154 may be configured to establish the FuSa connection with the external safety-island processor 124, for example, according to the FuSa level of the functionality performed by functional processing core 144, e.g., as described below.

In some demonstrative aspects, FuSa controller 154 may be configured to send to the external safety-island processor 124 FuSa information 155 corresponding to the functionality of the functional processing core 144, for example, via the FuSa transceiver 148, e.g., as described below.

In some demonstrative aspects, for example, FuSa controller 154 may be configured to read data from sensors, may process the data from the sensors, and may send the processed data to the external safety-island processor 124.

In some demonstrative aspects, FuSa controller 154 may be configured to control one or more FuSa operations of the functional processing core 144, for example, based on one or more control messages 116 received from the external safety-island processor 124, for example, via the FuSa transceiver 148, e.g., as described below.

In some demonstrative aspects, safety-island processor 124 may include a transceiver 114 configured to communicate over a communication interface 170 between the safety-island processor 124 and a motherboard, for example, motherboard 142, e.g., as described below.

In some demonstrative aspects, safety-island processor 124 may include a safety-island controller 126, e.g., as described below.

In some demonstrative aspects, safety-island controller 126 may include, or may be implemented, partially or entirely, by circuitry and/or logic, e.g., one or more processors including circuitry and/or logic, memory circuitry and/or logic, and/or any other circuitry and/or logic, configured to perform the functionality of safety-island controller 126. Additionally or alternatively, one or more functionalities of safety-island controller 126 may be implemented by logic, which may be executed by a machine and/or one or more processors, e.g., as described below.

In one example, safety-island controller 126 may include circuitry and/or logic, for example, one or more processors including circuitry and/or logic, to cause, trigger and/or control safety-island controller 126 and/or IPU 102, to perform one or more operations, communications and/or functionalities, e.g., as described herein. In one example, safety-island controller 126 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, safety-island controller 126 may be configured to monitor and/or control one or more FuSa operations of at least one functional processing core, for example, functional processing core 144, e.g., as described below.

In some demonstrative aspects safety-island controller 126 may be configured to monitor and/or control one or more operations of FuSa controller 154 and/or some or all components of motherboard 142.

In some demonstrative aspects, safety-island controller 126 may be configured to establish a FuSa connection with FuSa controller 154 on the motherboard 142, e.g., as described below.

In some demonstrative aspects, safety-island controller 126 may be configured to process the FuSa information 155 from the FuSa controller 154. For example, the FuSa information 155 may correspond to the functionality of the functional processing core 144, FuSa controller 154, and/or some or all other components, on the motherboard 142 having the associated FuSa level, e.g., as described below.

In some demonstrative aspects, safety-island controller 126 may be configured to send to the FuSa controller 154 one or more control messages 116, e.g., as described below.

In some demonstrative aspects, safety-island controller 126 may be configured to send the one or more control messages 116, for example, to monitor and/or control one or more FuSa operations of the functional processing core 144, for example, based on the FuSa information 155 and/or the FuSa level of the functional processing core 144, e.g., as described below.

In some demonstrative aspects, FuSa controller 154 may be configured to periodically send the FuSa information 155 to the external safety-island processor 124, e.g., as described below.

In some demonstrative aspects, FuSa controller 154 may be configured to periodically send the FuSa information 155 to the external safety-island processor 124 at a periodicity, which may be based, for example, on a FuSa attribute of the functional processing core 144 and/or FuSa controller 154, e.g., as described below.

In one example, the FuSa attribute of the functional processing core 144 may include, for example, a FuSa level, FuSa terms, FuSa features, and/or the like.

In some demonstrative aspects, safety-island controller 126 may be configured to periodically monitor a functional health of the functional processing core 144, for example, based on the FuSa information 155, e.g., as described below In some demonstrative aspects, the FuSa information 155 may include periodic health check library result information, e.g., as described below.

In one example, the periodic health check library result information may include Software Test Library (STL) result information.

In some demonstrative aspects, the FuSa information 155 may include Temporal and Logical monitor (TLM) result information, e.g., as described below.

In some demonstrative aspects, the FuSa information 155 may include safety workload information, e.g., as described below.

In some demonstrative aspects, the FuSa information 155 may include safety integrity information, e.g., as described below.

In some demonstrative aspects, the FuSa information 155 may include software fault information, e.g., as described below.

In some demonstrative aspects, the FuSa information 155 may include runtime verification information and/or SoC health information, e.g., as described below.

In other aspects, the FuSa information 155 may include any other additional and/or alternative type of information.

In some demonstrative aspects, the one or more control messages 116 may include a safety command, for example, to initiate transition of the functional processing core 144, FuSa controller 154, and/or some or all other components on the motherboard 142, to a safe state, e.g., as described below.

In some demonstrative aspects, the one or more control messages 116 may include any other additional and/or alternative commands and/or messages.

In some demonstrative aspects, FuSa controller 154 may be configured to initiate transition of the functional processing core 144 to a safe state, for example, based on an identified disconnection event indicating a potential disconnection of the FuSa connection with the external safety-island processor 124, e.g., as described below.

In some demonstrative aspects, safety-island controller 126 may be configured to negotiate a setup of the FuSa connection 179 with the FuSa controller 154, e.g., as described below.

In some demonstrative aspects, safety-island controller 126 may be configured to negotiate the setup of the FuSa connection 179 with the FuSa controller 154, for example, based on one or more negotiation messages, e.g., as described below.

In some demonstrative aspects, the FuSa controller 154 may be configured to negotiate the setup of the FuSa connection 179 with the external safety-island processor 124, for example, based on one or more negotiation messages, e.g., as described below.

In some demonstrative aspects, the safety-island controller 126 may be configured to negotiate the setup of the FuSa connection 179 with the FuSa controller 154, for example, based on an exchange of a first message from the FuSa controller 154 and a second message from the safety-island processor 124, e.g., as described below.

In some demonstrative aspects, FuSa controller 154 may be configured to negotiate the setup of the FuSa connection 179 with the external safety-island processor 124, for example, based on the exchange of the first message from the FuSa controller 154 and the second message from the safety-island processor 124, e.g., as described below.

In some demonstrative aspects, the first message may include required term information to indicate one or more required terms for the FuSa connection 179, e.g., as described below.

In some demonstrative aspects, the second message may include a commit indication to indicate whether the safety-island processor 124 is to commit to the one or more required terms, e.g., as described below.

In some demonstrative aspects, FuSa controller 154 may be configured to initiate a discovery operation to discover one or more external safety-island processors, for example, including safety-island processor 124, e.g., as described below.

In some demonstrative aspects, FuSa controller 154 may be configured to establish the FuSa connection with a discovered external safety-island processor, for example, safety-island processor 124, e.g., as described below.

In some demonstrative aspects, the discovery operation may include transmission of a discovery message by the FuSa controller 154 via the FuSa transceiver 148, e.g., as described below.

In some demonstrative aspects, FuSa controller 154 may be configured to initiate the discovery operation to discover safety-island processor 124, and/or to establish a FuSa connection 179 with the discovered external safety-island processor 124, e.g., as described below.

In some demonstrative aspects, FuSa controller 154 may be configured to initiate the discovery operation, for example, based on one or more criteria, e.g., as described below.

In some demonstrative aspects, FuSa controller 154 may be configured to initiate the discovery operation, for example, based on a reboot of the functional processing core 144, FuSa controller 154, and/or some or all other components on the motherboard 142, e.g., as described below.

In some demonstrative aspects, FuSa controller 154 may be configured to initiate the discovery operation, for example, based on a change in the functionality of the functional processing core 144, e.g., as described below.

In some demonstrative aspects, safety-island processor 124 may receive the discovery message from the FuSa controller 154, for example, via transceiver 114, and may establish a FuSa connection 179 with FuSa controller 154.

In some demonstrative aspects, FuSa controller 154 may be configured to discover one or more external safety-island processors based, for example, on one or more publish messages from the one or more external safety-island processors, e.g., as described below.

In some demonstrative aspects, safety-island controller 126 may be configured to transmit a publish message via the transceiver 116, e.g., as described below.

In some demonstrative aspects, safety-island controller 126 may be configured to periodically transmit the publish message, e.g., as described below.

In some demonstrative aspects, safety-island controller 126 may be configured to transmit the publish message, for example, based on the discovery message from the FuSa controller 154, e.g., as described below.

In some demonstrative aspects, the publish message may include capability information to indicate a FuSa capability of the safety-island processor 124, e.g., as described below.

In some demonstrative aspects, the FuSa capability information may include compute capability information corresponding to the safety-island processor 124, e.g., as described below.

In some demonstrative aspects, the compute capability information may be configured to indicate a count of simultaneous FuSa workloads supported by the safety-island processor 124, e.g., as described below.

In some demonstrative aspects, the FuSa capability information may include time information corresponding to the safety-island processor 124, e.g., as described below.

In some demonstrative aspects, the time information may be configured to indicate a safety loop time supported by the safety-island processor 124, e.g., as described below.

In some demonstrative aspects, the FuSa capability information may include safety capability information to indicate one or more safety capability attributes supported by the safety-island processor 124, e.g., as described below.

In one example, the safety capability information may include information relating to one or more systematic safety capability attributes supported by the safety-island processor 124, information relating to one or more safety protocols and/or standards supported by the safety-island processor 124, information relating to one or more security attributes supported by the safety-island processor 124, information relating to inference, and/or connection to cloud attributes supported by the safety-island processor 124, and/or any other suitable information.

In other aspects, the FuSa capability information may include any other additional and/or alternative information.

In some demonstrative aspects, FuSa controller 154 may be configured to process FuSa capability information in a message from a discovered external safety-island processor, e.g., as described below.

In some demonstrative aspects, the FuSa capability information may indicate a FuSa capability of the discovered external safety-island processor, e.g., as described below.

In some demonstrative aspects, the FuSa controller 154 may be configured to cause the FuSa transceiver 148 to transmit a discovery message, and to receive the message from the discovered external safety-island processor based on the discovery message, e.g., as described below.

In some demonstrative aspects, the FuSa controller 154 may be configured to select whether to establish the FuSa connection with the discovered external safety-island processor, for example, based on the FuSa capability information, e.g., as described below.

In some demonstrative aspects, FuSa controller 154 may be configured to process the FuSa capability information in the publish message from safety-island processor 124, e.g., as described below.

In some demonstrative aspects, the FuSa capability information may indicate a FuSa capability of the discovered external safety-island processor 124, e.g., as described below.

In some demonstrative aspects, FuSa controller 154 may be configured to select whether to establish the FuSa connection with the discovered external safety-island processor 124, for example, based on the FuSa capability information in the publish message from safety-island processor 124, e.g., as described below.

In some demonstrative aspects, system 100 may include a plurality of motherboards, for example, in a plurality of computing devices 140.

In some demonstrative aspects, the plurality of motherboards may include a plurality of FuSa controllers, e.g., as described below.

For example, a first motherboard of the plurality of motherboards may include a first FuSa controller, and a second motherboard of the plurality of motherboards may include a second FuSa controller, e.g., as described below.

In some demonstrative aspects, system 100 may include a computing device 160 including a motherboard 162, which may include a FuSa controller 164, e.g., as described below.

In some demonstrative aspects, safety-island controller 126 may be configured to control, e.g., simultaneously, one or more FuSa operations of computing device 160 and one or more FuSa operations of computing device 140, e.g., as described below.

In some demonstrative aspects, safety-island controller 126 may be configured to simultaneously maintain a first FuSa connection with a first FuSa controller of a first motherboard and a second FuSa connection with a second FuSa controller of a second motherboard, e.g., as described below.

In some demonstrative aspects, safety-island controller 126 may be configured to simultaneously maintain a first FuSa connection 179 with FuSa controller 154 of motherboard 142, and a second FuSa connection with FuSa controller 164 of motherboard 162, e.g., as described below.

In some demonstrative aspects, the safety-island controller 126 may be configured to process first FuSa information from a first FuSa controller corresponding to functionality of a functional processing core of a first motherboard, and to send to the first FuSa controller a first control message, for example, based on the first FuSa information, e.g., as described below.

In some demonstrative aspects, the safety-island controller 126 may be configured to process second FuSa information from a second FuSa controller corresponding to functionality of a functional processing core of the second motherboard, and to send to the second FuSa controller a second control message, for example, based on the second FuSa information, e.g., as described below.

In some demonstrative aspects, the safety-island controller 126 may be configured to process FuSa information 155 from FuSa controller 154 corresponding to the functionality of functional processing core 144 of motherboard 142, to send to the first FuSa controller 154 a first control message 116, for example, based on the first FuSa information 155, to process second FuSa information from the FuSa controller 164 corresponding to functionality of a functional processing core of the motherboard 162, and to send to the FuSa controller 164 a second control message, for example, based on the second FuSa information.

In some demonstrative aspects, system 100 may include a plurality of external safety-island processors, e.g., as described below.

For example, system 100 may include a plurality of IPUs 102 including a respective plurality of safety-island processors, e.g., as described below.

In some demonstrative aspects, system 100 may include an IPU 110 including a safety-island processor 112.

In some demonstrative aspects, FuSa controller 154 may be configured to initiate the discovery operation to discover one or more of the plurality of safety-island processors, and to establish a FuSa connection with one or more discovered external safety-island processors.

In some demonstrative aspects, FuSa controller 154 may be configured to initiate the discovery operation during a first FuSa connection with safety-island processor 124, e.g., FuSa connection 179.

In some demonstrative aspects, FuSa controller 154 may be configured to establish a second FuSa connection with a second external safety-island processor, for example, a second FuSa connection 181 with a safety-island processor 112, for example, based on the discovery operation, e.g., as described below.

In some demonstrative aspects, FuSa controller 154 may be configured to discover the one or more external safety-island processor, for example, based on one or more publish messages from the one or more external safety-island processors, e.g., as described below.

In one example, FuSa controller 154 may be configured to discover safety-island processor 124, for example, based on a publish message from safety-island processor 124, and/or to discover safety-island processor 112, for example, based on a publish message from safety-island processor 112.

In some demonstrative aspects, FuSa controller 154 may be configured to switch from a first FuSa connection with a first external safety-island processor to a second FuSa connection with a second external safety-island processor, e.g., as described below.

In some demonstrative aspects, FuSa controller 154 may be configured to switch from a first FuSa connection with safety-island processor 124, e.g., FuSa connection 179, to a second FuSa connection with safety-island processor 112, e.g., FuSa connection 181.

In some demonstrative aspects, FuSa controller 154 may be configured to simultaneously maintain a first FuSa connection with a first external safety-island processor and a second FuSa connection with a second external safety-island processor.

In some demonstrative aspects, FuSa controller 154 may be configured to simultaneously maintain a first FuSa connection with safety-island processor 124, e.g., FuSa connection 179, and a second FuSa connection with safety-island processor 112, e.g., FuSa connection 181.

In some demonstrative aspects, FuSa controller 154 may be configured to send first FuSa information corresponding to a functionality of functional processing core 144 to a first external safety-island processor, and to send second FuSa information corresponding to the functionality of the functional processing core 144 to a second external safety-island processor, e.g., as described below.

In some demonstrative aspects, FuSa controller 154 may be configured to control one or more FuSa operations of the functional processing core 144, for example, based on a first control message from the first external safety-island processor, and a second control message from the second external safety-island processor, e.g., as described below.

In one example, FuSa controller 154 may be configured to send first FuSa information 155 corresponding to the functionality of the functional processing core 144 to safety-island processor 124, to send second FuSa information corresponding to the functionality of the functional processing core 144 to external safety-island processor 112, and to control one or more FuSa operations of the functional processing core 144, for example, based on a first control message from the first external safety-island processor 124 and a second control message from the second external safety-island processor 112.

In some demonstrative aspects, one or more components of, and/or an architecture of, system 100 may be implemented to provide a technical solution to support the use of motherboards having a substantially identical design. This technical solution may reduce a design cost and/or a maintenance cost to ODMs.

In some demonstrative aspects, one or more components of, and/or an architecture of, system 100 may be implemented to provide a technical solution, which may support one or more additional safety IPUs 102, which may be plugged-in, for example, to handle new safety workloads and/or compute requirements.

In some demonstrative aspects, one or more components of, and/or an architecture of, system 100 may be implemented to provide a technical solution, which may support scalability, for example, by supporting implementation which is SoC family and/or SoC generation agnostic. For example, a same IPU 102 may be usable in a system, for example, even if one of the motherboards is replaced with one of a different family/generation.

In some demonstrative aspects, one or more components of, and/or an architecture of, system 100 may be implemented to provide a technical solution to support utilizing a generic interface, e.g., communication interface 170, for example, to enable reuse and/or standardization across SoCs, SKUs and/or silicon generations.

In some demonstrative aspects, one or more components of, and/or an architecture of, system 100 may be implemented to provide a technical solution to support utilizing a generic interface, e.g., communication interface 170, to enable reuse of identical solutions for various use cases, for example, industrial discrete automation, process automation, discrete automation, AMRs, and/or any other automation systems, for example, while reducing engineering cost and/or simplifying design, which may result in a faster time to market.

In some demonstrative aspects, one or more components of, and/or an architecture of, system 100 may be implemented to provide a technical solution to support FuSa as an IPU, which may be plugged in and/or deployed on need basis.

In some demonstrative aspects, one or more components of, and/or an architecture of, system 100 may be implemented to provide a technical solution to support scaling of FuSa as an IPU, for example, across many control function use cases, e.g., ranging from industrial automation, process automation, autonomous mobile robots, or even in other disciplines, e.g., Automotive, Aerospace, Medical, and/or electrical distribution, e.g., sub station platforms.

Figure 2:
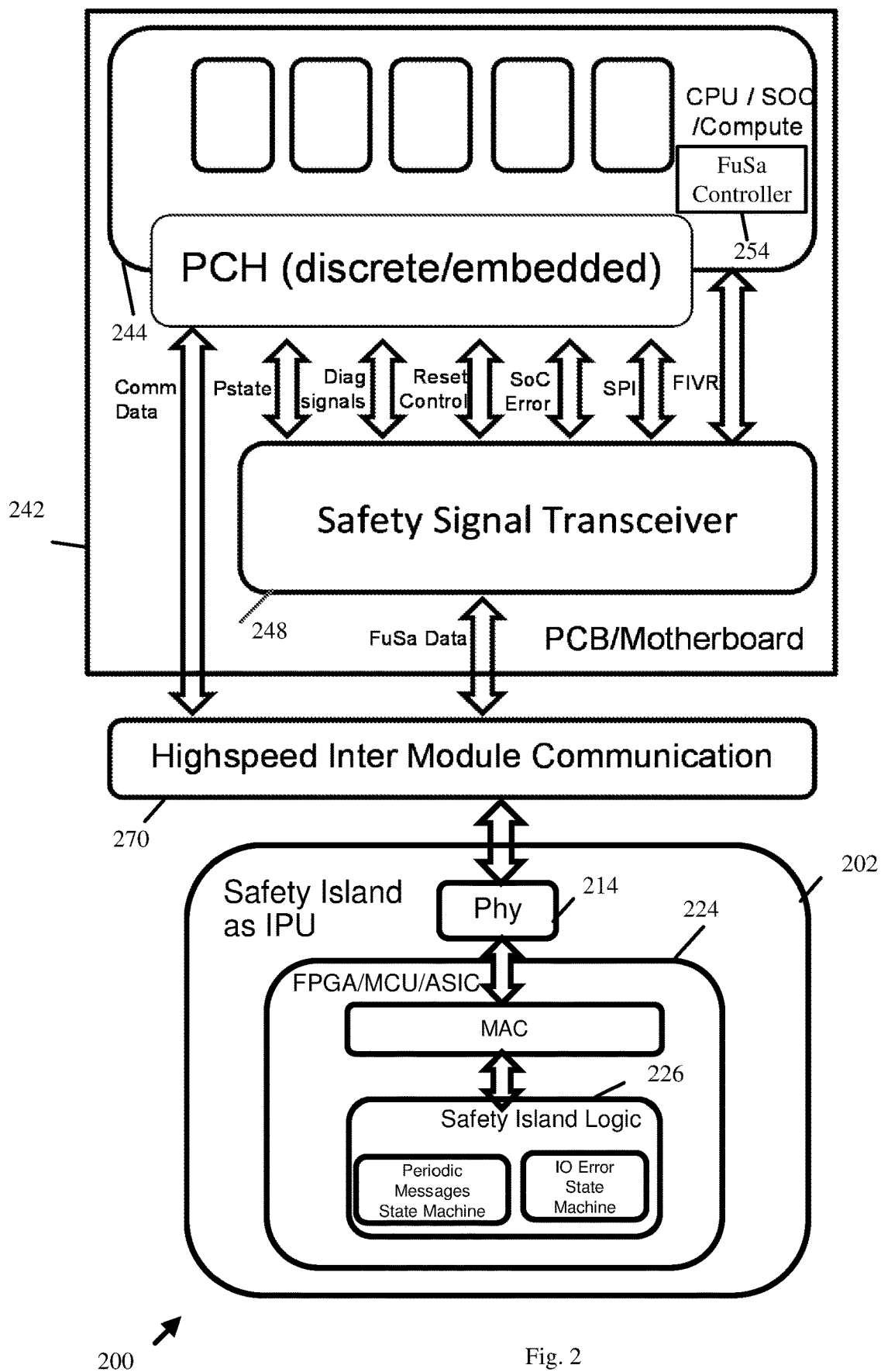
FIG. 2 is a schematic illustration of a Functional-Safety (FuSa) system architecture, in accordance with some demonstrative aspects.

Reference is made to FIG. 2, which schematically illustrates a FuSa system architecture 200, in accordance with some demonstrative aspects. For example, system 100 (FIG. 1) may include one or more elements of FuSa system architecture 200, and/or may perform one or more operations and/or functionalities of FuSa system architecture 200.

In some demonstrative aspects, as shown in FIG. 2, FuSa system architecture 200 may include a motherboard 242 having a FuSa connection via a communication interface 270 with an IPU 202. For example, IPU 102 (FIG. 1) may include one or more elements of IPU 202, and/or may perform one or more operations and/or functionalities of IPU 202; motherboard 142 (FIG. 1) may include one or more elements of motherboard 242, and/or may perform one or more operations and/or functionalities of motherboard 242; and/or communication interface 170 (FIG. 1) may include one or more elements of communication interface 270, and/or may perform one or more operations and/or functionalities of communication interface 270.

In some demonstrative aspects, as shown in FIG. 2, motherboard 242 may include a functional processing core 244, e.g., an SoC, a FuSa transceiver 248 (also referred to as a "Safety Signal Transceiver (SST)", and/or a FuSa controller 254. For example, functional processing core 144 (FIG. 1) may include one or more elements of functional processing core 244, and/or may perform one or more operations and/or functionalities of functional processing core 244; FuSa transceiver 148 (FIG. 1) may include one or more elements of FuSa transceiver 248, and/or may perform one or more operations and/or functionalities of FuSa transceiver 248; and/or FuSa controller 154 (FIG. 1) may include one or more elements of FuSa controller 254, and/or may perform one or more operations and/or functionalities of FuSa controller 254.

In some demonstrative aspects, as shown in FIG. 2, IPU 202 may include a safety-island processor 224 including a transceiver 214 configured to communicate over the communication interface 270 between the safety-island processor 224 and the motherboard 242. For example, transceiver 114 (FIG. 1) may include one or more elements of transceiver 214 and/or may perform one or more operations and/or functionalities of transceiver 214.

In some demonstrative aspects, as shown in FIG. 2, safety-island processor 224 may include a safety-island controller 226. For example, safety-island controller 126 (FIG. 1) may include one or more elements of safety-island controller 226, and/or may perform one or more operations and/or functionalities of safety-island controller 226.

In one example, FuSa system architecture 200 may demonstrate a deployment of FuSa in IPU 202 including a generic interface, e.g., communication interface 270, supporting connection to an SoC, e.g., of motherboard 242.

In some demonstrative aspects, motherboard 242 may be implemented on an IPC or a controller, and may include a standard/open interface, which may be used, for example, in FuSa and/or non-FuSa use cases.

In some demonstrative aspects, the safety signal transceiver 248 may be a low-cost IC, and/or any other transceiver.

In some demonstrative aspects, the safety signal transceiver 248 may be configured to comply with one or more common network protocols, e.g., Open Platform Communications (OPC) Unified Architecture (UA) (OPCUA), Ethernet for Control Automation Technology (EtherCAT), Process Field Net (PROFINET), Controller Area Network (CAN), and/or any other protocols.

In some demonstrative aspects, the safety signal transceiver 248 may be configured to periodically provide Safety IO information to safety-island processor 224, e.g., as an IPU.

In some demonstrative aspects, the safety signal transceiver 248 may include a dedicated integrated Chip (IC) from a vendor.

In some demonstrative aspects, the safety signal transceiver 248 may include a Field Programmable Gate Array (FPGA), an Application-Specific Integrated Circuit (ASIC), and/or a micro Controller (uController), which may be programmed to a specific protocol.

In some demonstrative aspects, FuSa transceiver 248 may be configured to read FuSa information and/or Status IOs from functional processing core 244, and share this information with safety-island processor 224, for example, to allow safety-island processor 224 to periodically monitor a health of functional processing core 244, FuSa controller 254 and/or motherboard 242.

In some demonstrative aspects, the health of the functional processing core 244 may be monitored, e.g., periodically, for example, at a hardware level and/or at a software level, for example, to ensure FuSa system architecture 200 is operating within safety limits.

In some demonstrative aspects, a communication link, denoted Comm Data, may be utilized to communicate data between functional processing core 244 and communication interface 270.

In some demonstrative aspects, the communication link Comm Data may be configured to communicate On-Demand Cross Comparison (ODCC) snapshots, periodic health check library result information, Software Test Library (STL) results, Temporal and Logical Monitor (TLM) results, and/or any other suitable type of information. For example, the communication link Comm Data and SST 248 may use a same communication protocol, for example, based on dependency of a physical layer.

In some demonstrative aspects IPU 202 may be configured according to a modular design, e.g., for backplane systems.

In some demonstrative aspects IPU 202 may be configured as an independent module/box, which may be applied to a whole FuSa system, e.g., anywhere in a backbone and/or a backplane.

In some demonstrative aspects, FuSa system architecture 200 may support a technical solution to implement a plurality of IPUs 202. For example, this solution may allow to maintain a high availability and/or redundancy, for example, to handle system downtime/maintenance, e.g., for firmware updates, while delivering required safety functions.

In some demonstrative aspects, a plurality of IPUs 202 may be implemented, for example, to support a technical solution to enable dual/triple redundancy of IPUs 202, e.g., with single cycle failover. For example, an IPU 202 may be configured to seamlessly takeover a companion failed IPU 202 and to continue to serve FuSa, e.g., in case of a fault in the companion IPU 202.

In some demonstrative aspects, a health level of the functional processing core 244 may be read and check, e.g., periodically, for safe levels, for example, via system health signals, IO pins, and/or the like.

In some demonstrative aspects, FuSa system architecture 200 may be implemented to address one or more technical deficiencies of implementations utilizing an ISI, e.g., an SoC ISI and/or an MB ISI.

In one example, an SoC ISI implementation may include an ISI within an SoC to monitor the health of HW and IO components.

In another example, an MB ISI implementation may include an MB ISI connected outside of the SoC, e.g., on the same motherboard/board, to read the health IO pins/signals of the SoC and a communication channel, and/or to periodically check the health of the compute, e.g., by ODCC or the like.

According to these examples, both of the SoC ISI and the MB ISI implementations may be expensive, e.g., as they require a new board design with a dedicated FuSa motherboard including FuSa compliant components. The SoC ISI and the MB ISI implementations may prevent reuse and resource sharing, for example, if the FuSa resources are underutilized. In addition, any change in end user need, e.g., high compute, low power, non-availability of interface, new signals, and/or the like may require a new board design altogether.

In some demonstrative aspects, one or more software components may be configured to monitor, e.g., periodically, the health of the functional processing core 244, FuSa controller 254, and/or some or all other components on the motherboard 242, for example, to ensure components of FuSa system architecture 200 are operating within safety limits, e.g., as described below.

In some demonstrative aspects, various FuSa software components may be designed, for example, in line of a Safety Element out of Context (SEooC) mechanism. This may enable reusing the SEooC across multiple boards, designs and/or use cases.

In some demonstrative aspects, the FuSa software components may be used to monitor health of an SoC, e.g., on motherboard 242, for example, using Temporal and Logical Monitor (TLM), Software Test Libraries (STL), and/or the like, and/or to monitor output of control algorithms in combination with sensor data, e.g., in a form of ODCC.

In some demonstrative aspects, monitoring results of the FuSa software components may be shared with safety-island processor 224, for example, to determine whether or not functional processing core 244 is healthy.

In some demonstrative aspects, for example, in a case of a discrete Safety Island IPU, the monitoring results may be shared, for example, using a packaged message, which may be end-to-end protected with an integrity check and/or a security check. The packaged message may be shared, for example, over a reliable interface to safety-island processor 224. This may be in contrast to point-to-point interfaces, such as, Serial Peripheral Interface (SPI), Inter-Integrated Circuit (I2C), Peripheral Component Interconnect Express (PCIe), or the like, which may be used in ISI implementations.

In one example, the point-to-point interfaces may include a fixed interface design, which may be tightly coupled to a board certification, and/or a software design to a specific interface. Accordingly, any change in an interface and/or a communication mechanism may result in recertification of the software components as well, which may be an expensive and/or a time-consuming activity. For example, the point-to-point interfaces may limit reuse and/or scale, which may be important to retain hardware and/or software interfaces, and/or to reuse them across multiple designs.

In some demonstrative aspects, motherboard 242 may be configured according to a generic board design to contain an SoC, e.g., instead of using a dedicated, tightly coupled-to-host safety island, e.g., as in the ISI implementations.

In some demonstrative aspects, using the generic board design for motherboard 242 may provide a technical solution using an inexpensive, reliable SST, e.g., SST 248, for example, to convert various IO signals, e.g., parallel IOs, from the SoC to a serial message to be sent to safety-island processor 224 in IPU 202, over a communication interface, e.g., communication interface 270. For example, communication interface 270 may be implemented using an Ethernet interface, a CAN interface, and/or any multi-drop based interface.

In some demonstrative aspects, the ability to use a generic design of motherboard 242 may support a technical solution for use in a wide range of scenarios, e.g., all scenarios, for example, regardless of whether FuSa is needed or not.

In some demonstrative aspects, the implementation of the external safety island 224 may support a technical solution using a generic design of motherboard 242, which may enable generic hardware compute designs without safety overhead.

In one example, the implementation of the external safety island 224 may support a technical solution using a generic design of motherboard 242, which may be suitable for use across families and generations of SoCs, e.g., as an SEooC, for example, with well-defined interfaces.

In some demonstrative aspects, FuSa system architecture 200 may be configured to support safety software components running the TLMs, STLs and ODCCs over the SoC.

In some demonstrative aspects, FuSa system architecture 200 may be configured to utilize communication interface 270 to communicate information to IPU 202, for example, with dual redundancy in industrial/automotive settings and/or High availability/High reliability settings/environments.

In one example, communication interface 270 may include a suitable industry established network interface, for example, Ethercat using Functional Safety over Ethercat or Safety over EtherCAT (FSoE), ProfiSafe, Controller Area Network (CAN), and/or any other certified solution, e.g., with end-to-end integrity check.

In some demonstrative aspects, FuSa system architecture 200 may be implemented to support a technical solution to maintain a software architecture and/or design of motherboard 242 the same, for example, even when changing safety channel communication versions and/or hardware, e.g., if they have backward compatibility, for example, due to long life of industrial systems.

In some demonstrative aspects, safety-island processor 224 may be configured to send a Not OK (NOK) message to functional processing core 244, for example, via SST 248. For example, safety-island processor 224 may be configured to send the NOK message in case of a fault and/or an error detection. In one example, SST 248 may be configured to drive an IO PIN on the SoC to transition functional processing core 244 to a Safe state, to signal an on board Power Management Unit (PMU) to switch off the SoC, and/or to a companion Safety controller, for example, as may be necessitated by a design and/or Safe-State criteria.

In some demonstrative aspects, safety-island processor 224 may be configured to drive a specific IO of the SoC to trigger an operation, for example, based on any other use case scenario and/or implementation.

In some demonstrative aspects, one or more safety messages communicated between safety-island processor 224 and functional processing core 244 may be assigned to a higher priority channel, e.g., to allow reliable delivery in a time-bound manner. For example, the safety messages may be significantly smaller, e.g., compared to usual network messages. For example, the safety messages may be assigned to the higher priority channel, for example, using technologies, such as Time Sensitive Network (TSN) safety messages.

In some demonstrative aspects, motherboard 242 may include a plurality of SSTs 248, for example, to support redundancy. In one example, e SST 248 and communication buses may be replicated, for example, to meet specific availability targets.

In some demonstrative aspects, IPU 202 may be configured to monitor the health of the SoC 244 compute and may send one or more responses to specific safety-application requests.

In some demonstrative aspects, IPU 202 may be implemented on a silicon of choice, e.g., an FPGA, an ASIC, a uController, and/or the like. For example, IPU 202 may be compliant with the network interface 270, and/or a protocol and packaging format of messages exchanged with SoC 244.

In some demonstrative aspects, implementing the safety island 224 as part of IPU 202 may support a technical solution to allow flexibility to ODMs, System Integrators (SIs), and/or one or more end customers in choosing an IPU, e.g., based on price/performance, use case and/or protocols of their choice, and/or to "mix and match" from different vendors, e.g., to sustain supply and retain flexibility.

In some demonstrative aspects, implementing the safety island 224 as part of IPU 202 may support a technical solution for implementations utilizing an IPC including motherboard 242, for example, to allow flexibility to IPC vendors that comply with such a design. For example, a same IPC may be deployed, e.g., everywhere, and safety solutions, e.g., IPUs 202, may be added when a need arises. For example, implementing the safety island 224 as part of IPU 202 may support a flexible solution with low cost.

In some demonstrative aspects, implementing the safety island 224 as part of IPU 202 may support a technical solution supporting standards to define FuSa interfaces, which may lead to a trend towards democratizing Functional Safety. These implementations may enable to visualize FuSa as an infrastructure, e.g., as an available product, which may be used on need basis, for example, with minimal compute overhead, e.g., in the form of safety workloads on a host SoC.

In some demonstrative aspects, safety-island processor 224 may be configured to provide telemetry data for Artificial intelligence (AI) and/or Machine Learning (ML) purposes.

In some demonstrative aspects, safety-island processor 224 may be configured to provide information with respect to how hosts are performing, e.g., in terms of temperature, correctable error count data and/or the like, and/or to inform a reason why a host was brought down. For example, safety-island processor 224 may be configured to provide this information to edge analytics and/or to Supervisory Control and Data Acquisition (SCADA) systems.

Figure 3:
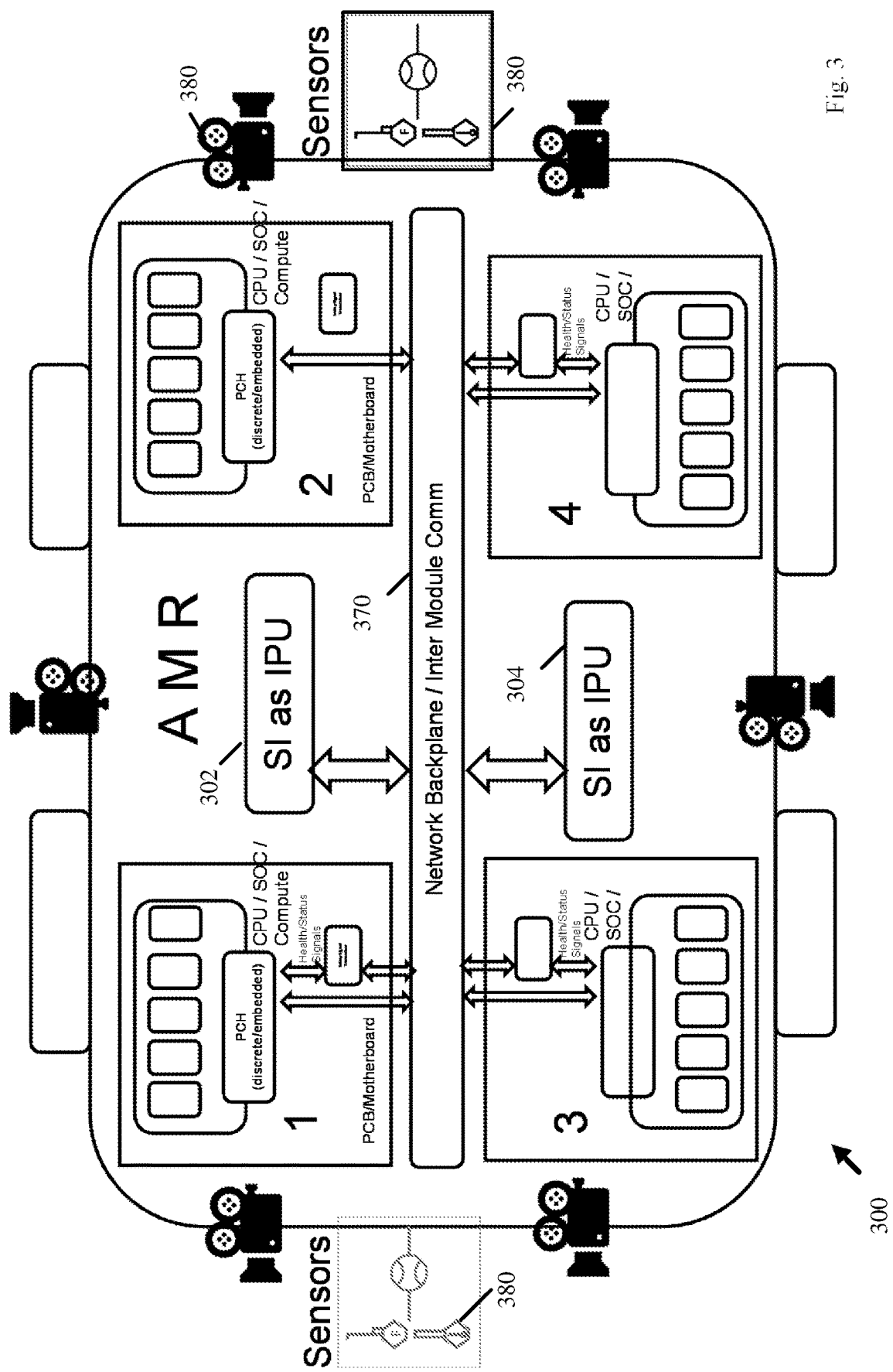
FIG. 3 is a schematic illustration of an Autonomous Mobile Robot (AMR) system, in accordance with some demonstrative aspects.

Reference is made to FIG. 3, which schematically illustrates an Autonomous Mobile Robot (AMR) system 300, in accordance with some demonstrative aspects. For example, system 100 (FIG. 1) may include one or more elements of system 300, and/or may perform one or more operations and/or functionalities of system 300.

In some demonstrative aspects, as shown in FIG. 3, system 300 may include a plurality of motherboards, denoted 1, 2, 3, 4, and a plurality of IPUs, including an IPU 302 and an IPU 304, e.g., as described below. For example, IPU 302 and/or IPU 304 may include one or more elements of IPU 102 (FIG. 1), and/or may perform one or more operations and/or functionalities of IPU 102 (FIG. 1); and/or motherboards 1, 2, 3, and/or 4 may include one or more elements of motherboard 142 (FIG. 1), and/or may perform one or more operations and/or functionalities of motherboard 142 (FIG. 1).

In some demonstrative aspects, one or more of motherboards 1, 2, 3, and/or 4 may be connected by FuSa connections to IPU 302 and/or to IPU 304, for example, via a communication interface 370. For example, communication interface 370 may include one or more elements of communication interface 170 (FIG. 1), and/or may perform one or more operations and/or functionalities of communication interface 170 (FIG. 1).

In some demonstrative aspects, an AMR system, e.g., AMR system 300, or a delivery Automated Guided Vehicle (AGV), may utilized increased computing efforts, for example, as a result of reading and/or processing information from multiple sensors, e.g., for path planning and/or maneuvering.

In some demonstrative aspects, safety requirements for different motherboards, e.g., for each of the motherboards 1, 2, 3, and/or 4, for example, on hardware and/or software changes, may be different, for example, depending on whether they are deployed in a contained environment, e.g., with no human interaction, or in an open environment, e.g., a public pizza delivery AGV, which may have high exposure with an increased risk of human injury.

In some demonstrative aspects, AMR system 300 may include a plurality of motherboards having different compute SoCs, for example, based on compute requirements. For example, the motherboards of AMR system 300 may utilize first compute requirements for processing sensor information, second compute requirements for processing graphics, and/or third compute requirements for algorithmic computations.

In some demonstrative aspects, as shown in FIG. 3, AMR system 300 may include sensors 380, which may be used for operation and/or maneuvering, e.g., of a vehicle.

In some demonstrative aspects, a similar hardware design may be used for each of the motherboards. For example, all motherboards 1, 2, 3, and 4 may be identical.

In other aspects, some motherboards of motherboards 1, 2, 3, and 4 may be identical. For example, two or more motherboards of motherboards 1, 2, 3, and 4 may be different in their design, for example, based on IO/Sensor requirements.

In other aspects, all motherboards 1, 2, 3, and 4 may be different.

In some demonstrative aspects, as shown in FIG. 3, IPU 302 and/or IPU 304 may be plugged into a network backplane, e.g., to communication interface 370, for example, to monitor the health of the motherboards, e.g., as may be required by one or more of the motherboards.

In some demonstrative aspects, not all sensors may be safety qualified, and only some of the motherboards, e.g., motherboards 1, 2 and 4, may be connected to safety sensors and may read information, e.g., periodically, from the sensors 380.

In some demonstrative aspects, motherboards 1, 3 and 4 may read one or more safety sensors 380 and may send their health status periodically, e.g., to one or more IPUs, e.g., IPU 302 and/or IPU 304, for example, to qualify to run safety workloads.

In some demonstrative aspects, motherboard 2 may run generic compute workloads and may have no safety requirements.

In some demonstrative aspects, motherboard 2 may not read any safety sensors and, therefore, its SST, though present, may not be in use. Accordingly, no connection may be required between motherboard 2 and IPU 302 and/or IPU 304.

In some demonstrative aspects, a software update on the mother boards may enable a same setup to operate safely in an exposed environment.

In some demonstrative aspects, two Safety IPUs, e.g., IPUs 302 and/or 304 may be plugged into the backplane 370, for example, after calculating the number of sensors 380 and availability demands.

In some demonstrative aspects, a firmware of IPU 302 and a firmware of IPU 304 may be the same or may be different, for example, if IPU 302 and IPU 304 have different compute capabilities and/or safety check algorithm demands.

In some demonstrative aspects, each motherboard of motherboards 1, 2, 3, and/or 4, may have similar or different compute SoCs, for example, depending on sensors they are monitoring.

In some demonstrative aspects, one or more of, e.g., each of, motherboards 1, 2, 3, and/or 4, may have to comply with a safety communication protocol with IPU 302 and IPU 304.

Figure 4:
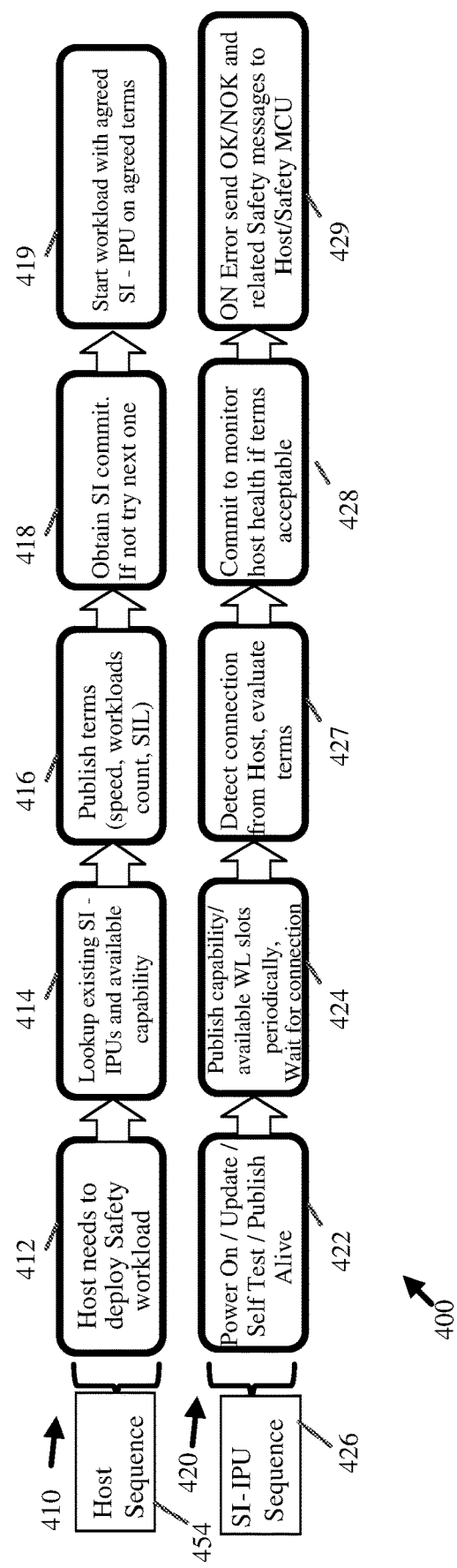
FIG. 4 is a schematic illustration of a FuSa connection establishment scheme to establish a FuSa connection between a functional processing core and a safety-island processor, in accordance with some demonstrative aspects.

Reference is made to FIG. 4, which schematically illustrates a FuSa connection establishment scheme 400 to establish a FuSa connection between a functional processing core and a safety-island processor, in accordance with some demonstrative aspects.

In some demonstrative aspects, as shown in FIG. 4, FuSa connection establishment scheme 400 may include one or more operations 410 to be performed by a FuSa controller 454 of the functional processing core. For example, FuSa controller 154 (FIG. 1) may include one or more elements of FuSa controller 454, and/or may perform one or more operations and/or functionalities of FuSa controller 454.

In some demonstrative aspects, as shown in FIG. 4, FuSa connection establishment scheme 400 may include one or more operations 420 to be performed by a safety-island controller 426 of the safety-island processor. For example, safety-island controller 126 (FIG. 1) may include one or more elements of safety-island controller 426, and/or may perform one or more operations and/or functionalities of safety-island controller 426.

In some demonstrative aspects, as indicated at block 424, safety-island controller 426 may send a publish message including FuSa capability information to indicate a FuSa capability of the safety-island processor, for example, upon one or more events indicated at block 422, e.g., power on, an update event, a self-test, periodically, and/or based on any other criteria.

In some demonstrative aspects, as indicated at block 412, FuSa controller 454 may determine that the functional processing core may need to perform a functionality having a FuSa level.

In some demonstrative aspects, as indicated at block 414, FuSa controller 454 may look up IPUs and their available capabilities.

In some demonstrative aspects, as indicated at block 416, FuSa controller 454 may publish terms for the FuSa connection, for example, based on the publish message from the safety-island processor.

In some demonstrative aspects, as indicated at block 427, safety-island controller 426 may detect the terms for the FuSa connection from the functional processing core, and may evaluate the terms for the FuSa connection.

In some demonstrative aspects, as indicated at block 428, safety-island controller 426 may select to commit to the terms for the FuSa connection from the functional processing core, for example, if the terms are acceptable.

In some demonstrative aspects, as indicated at block 418, FuSa controller 454 may obtain the commit from the safety-island controller 426 or may look for another commitment from another safety-island controller.

In some demonstrative aspects, as indicated at block 419, FuSa controller 454 may share a safety workload of the functional processing core with the safety-island processor, for example, based on the agreed terms.

In some demonstrative aspects, as indicated at block 429, safety-island controller 426 may monitor the health status of the functional processing core, for example, based on the agreed terms. For example, safety-island controller 426 may send NOK/OK messages and/or other safety messages to the functional processing core, for example, based on detection of one or more safety events.

Figure 5:
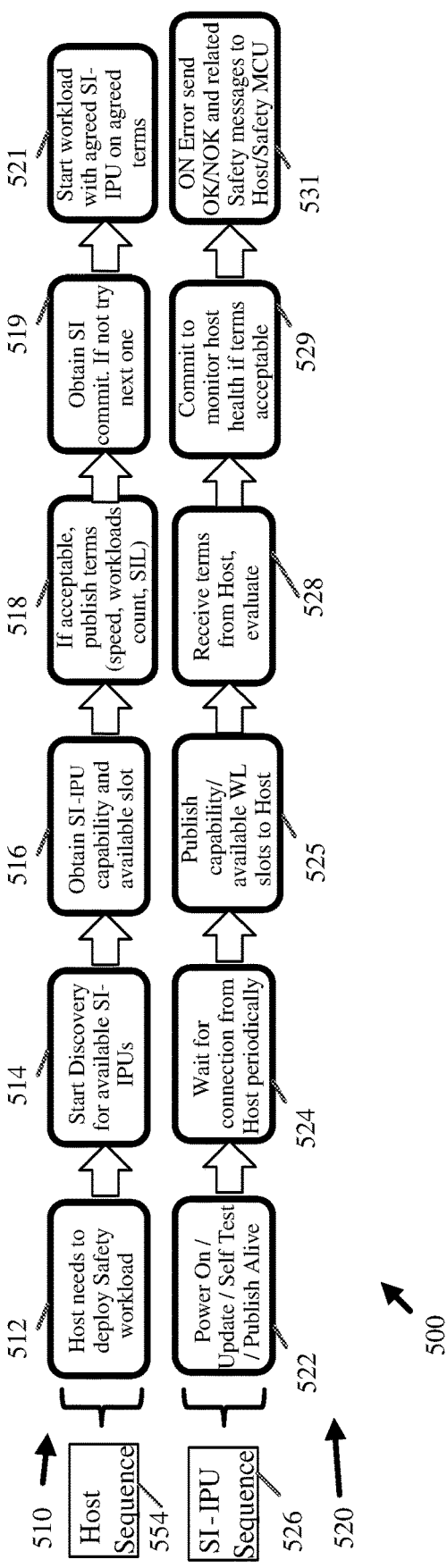
FIG. 5 is a schematic illustration of a FuSa connection establishment scheme to establish a FuSa connection between a functional processing core and a safety-island processor, in accordance with some demonstrative aspects.

Reference is made to FIG. 5, which schematically illustrates a FuSa connection establishment scheme 500 to establish a FuSa connection between a functional processing core and a safety-island processor, in accordance with some demonstrative aspects.

In some demonstrative aspects, as shown in FIG. 5, FuSa connection establishment scheme 500 may include one or more operations 510 to be performed by a FuSa controller 554 of the functional processing core. For example, FuSa controller 154 (FIG. 1) may include one or more elements of FuSa controller 554, and/or may perform one or more operations and/or functionalities of FuSa controller 554.

In some demonstrative aspects, as shown in FIG. 5, FuSa connection establishment scheme 500 may include one or more operations 520 to be performed by a safety-island controller 526 of the safety-island processor. for example, safety-island controller 126 (FIG. 1) may include one or more elements of safety-island controller 526, and/or may perform one or more operations and/or functionalities of safety-island controller 526.

In some demonstrative aspects, as indicated at block 512, FuSa controller 554 may determine that the functional processing core needs to perform a functionality having a FuSa level.

In some demonstrative aspects, as indicated at block 514, FuSa controller 554 may send a discovery message to look for available safety-island processors.

In some demonstrative aspects, as indicated at block 524, safety-island controller 526 may wait for a discovery message from a functional processing core, for example, based on one or more events indicated at block 522, e.g., power on, an update event, a self-test, periodically, and/or any other criteria.

In some demonstrative aspects, as indicated at block 525, safety-island controller 526 may publish capability information for the FuSa connection, for example, based on the discovery message from the functional processing core.

In some demonstrative aspects, as indicated at block 516, FuSa controller 554 may obtain the capability information from the safety-island controller 526, for example, including an available slot.

In some demonstrative aspects, as indicated at block 518, FuSa controller 554 may publish the terms for the FuSa connection, for example, if the capability information is acceptable.

In some demonstrative aspects, as indicated at block 528, safety-island controller 526 may receive the terms for the FuSa connection from the functional processing core, and may evaluate the terms for the FuSa connection.

In some demonstrative aspects, as indicated at block 529, safety-island controller 526 may select to commit to the terms for the FuSa connection from the functional processing core, e.g., if the terms are acceptable.

In some demonstrative aspects, as indicated at block 519, FuSa controller 554 may obtain the commit from the safety-island controller 526, or may look for another commitment from another safety-island controller.

In some demonstrative aspects, as indicated at block 521, FuSa controller 554 may share safety workload of the functional processing core with the safety-island processor, for example, based on the agreed terms.

In some demonstrative aspects, as indicated at block 531, safety-island controller 526 may monitor the health status of the functional processing core, for example, based on the agreed terms. For example, safety-island controller 526 may send a NOK/OK messages and/or other safety messages to the functional processing core, for example, based on detection of one or more safety events.

Referring back to FIG. 3, in some demonstrative aspects, FuSa controllers of the motherboards 1, 3 and/or 4, e.g., FuSa controller 154 (FIG. 1), may be configured to perform one or more operations of FuSa connection establishment scheme 500, and/or FuSa connection establishment scheme 400 (FIG. 4), for example, to establish communication with one or more IPUs, e.g., IPU 302 and/or IPU 304. For example, FuSa controllers of the motherboards 1, 3 and/or 4, e.g., FuSa controller 154 (FIG. 1), may be configured to initiate discovery of the IPUs, for example, once motherboards 1, 3 and/or 4 are activated/deployed, e.g., by power on, or by orchestration.

In some demonstrative aspects, a safety application on the motherboards 1, 3 and/or 4 may identify its matching IPU with a shared capability data structure, and may establish a bond, e.g., a FuSa connection. For example, this connection establishment may be homogenous, e.g., with two or more IPUs having identical traits. In that case, the safety application may use, for example, the first IPU that responds to a request to establish the FuSa connection.

In some demonstrative aspects, when the FuSa connection is established, the IPU, e.g., IPU 302 and/or IPU 304, may check the health of the motherboard or SoC, which may involve few power cycles. The IPU may respond with a 'Proceed' command and/or a Safety critical control algorithm, for example, to start to control the health of the connected motherboard or the SoC.

Figure 6:
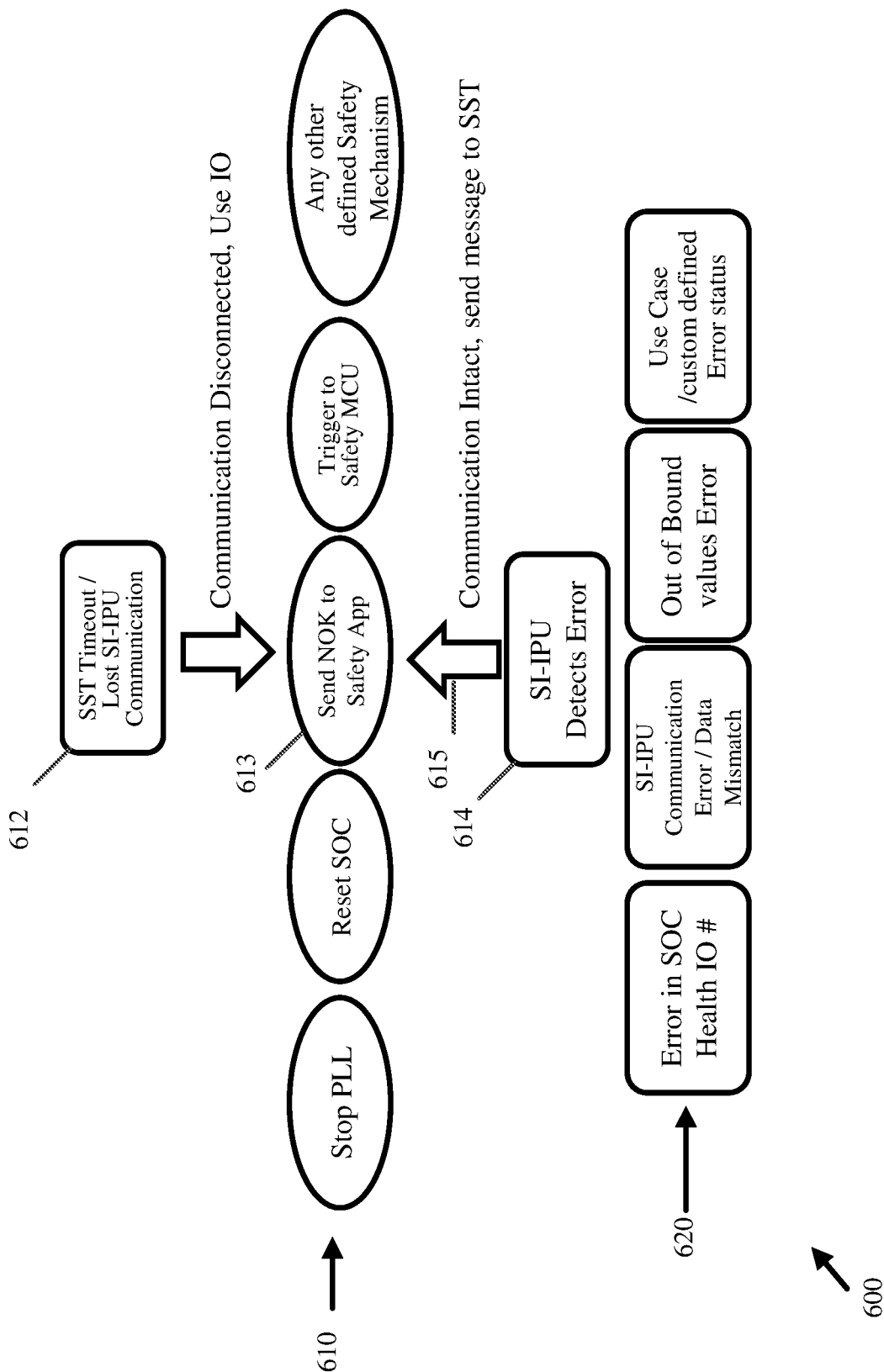
FIG. 6 is a schematic illustration of an error handling scheme, in accordance with some demonstrative aspects.

Reference is made to FIG. 6, which schematically illustrates an error handling scheme 600, in accordance with some demonstrative aspects. For example, safety-island controller 126 (FIG. 1) and/or FuSa controller 148 (FIG. 1) may be configured to perform one or more operations and/or functionalities of error handling scheme 600.

In some demonstrative aspects, as indicated at block 612, a FuSa controller, e.g., FuSa controller 148 (FIG. 1), may cause, control and or trigger one or more safety operations 610, for example, to protect safety of a functional processing core, e.g., functional processing core 148 (FIG. 1), for example, when communication between the functional processing core and a safety-island processor, e.g., safety-island processor 124 (FIG. 1), is disconnected.

In some demonstrative aspects, as indicated at block 614, a safety-island controller, e.g., safety-island controller 126 (FIG. 1), may send one or messages 615 to trigger the FuSa controller to perform the one or more of the safety operations 610, for example, when the safety-island controller detects an error in the functional processing core.

In some demonstrative aspects, as shown in FIG. 6, the detected error may be one or more errors from a plurality of possible errors 620.

In some demonstrative aspects, as shown in FIG. 6, the safety-island controller, e.g., safety-island controller 126 (FIG. 1), may send a NOK message 613 and/or an IO message to drive IOs to the functional processing core, for example, when the safety-island controller, e.g., safety-island controller 126 (FIG. 1), detects an error in the communication or health status of the SoC, or any other anomaly that may prevent the safety-island controller to deterministically monitor the health of the SoC.

In some demonstrative aspects, the FuSa controller, e.g., FuSa controller 148 (FIG. 1), may read the NOK message 613, and/or the IO message, which may be received via a FuSa transceiver, e.g., FuSa transceiver 148 (FIG. 1), and may perform one or more of the operations 610, e.g., reset the SoC, stop a Phased lock Loop (PLL) clock, communicate with a safety Micro Controller Unit (MCU) on board, e.g., if existing.

In some demonstrative aspects, in case of a lost communication, e.g., based on a timeout, with safety-island controller, the FuSa controller may drive one or more of these signals and/or operations, for example, to transform the functional processing core into a safe state, which may prevent safety critical compute from executing further on the functional processing core.

In some demonstrative aspects, if the safety-island controller, e.g., safety-island controller 126 (FIG. 1), is capable of, and/or understands, actuators involved, the safety-island controller, e.g., safety-island controller 126 (FIG. 1), may send safe stop messages to respective actuators, for example, to transform the functional processing core into the safe state.

In some demonstrative aspects, the safety-island controller, e.g., safety-island controller 126 (FIG. 1), may also publish the host status, e.g., the functional processing core status, and data to SCADA systems for further action/maintenance.

In some demonstrative aspects, one or more additional safety-island controllers may be plugged-in to a backplane, for example, to provide additional redundancy/availability, and/or to address additional future safety workloads, sensors or additional compute loads, which may be deployed based on need, and/or based on use case, e.g., an AMR system deployed in hospital versus an industrial closed system.

Figure 7:
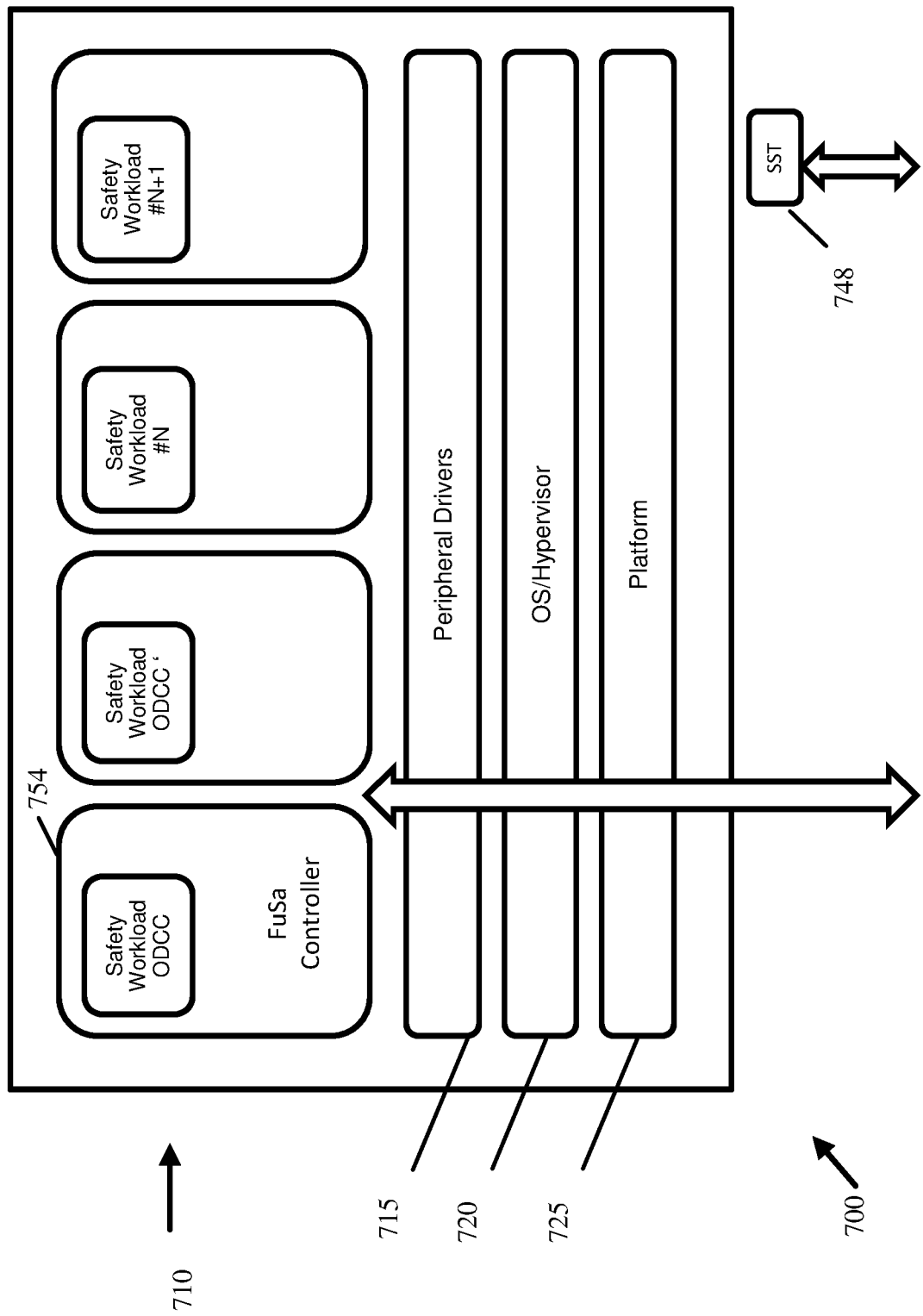
FIG. 7 is a schematic illustration of a software architecture, in accordance with some demonstrative aspects.

Reference is made to FIG. 7, which schematically illustrates a software architecture 700, in accordance with some demonstrative aspects.

In some demonstrative aspects, software architecture 700 may be implemented as part of a motherboard, e.g., mother board 142 (FIG. 1).

In some demonstrative aspects, as shown in FIG. 7, software architecture 700 may include a plurality of functional processing cores 710. For example, a functional processing core 710 may include one or more elements of functional processing core 144 (FIG. 1), and/or may perform one or more operations and/or functionalities of functional processing core 144 (FIG. 1).

In some demonstrative aspects, as shown in FIG. 7, software architecture 700 may include one or more peripheral drivers 715, an OS 720, and/or a platform 725.

In some demonstrative aspects, as shown in FIG. 7, software architecture 700 may include a FuSa controller 754. For example, FuSa controller 154 (FIG. 1) may include one or more elements of FuSa controller 754, and/or may perform one or more operations and/or functionalities of FuSa controller 754.

In some demonstrative aspects, FuSa controller 754 may be configured to perform interaction with a safety-island processor of an IPU, e.g., safety-island processor 124 (FIG. 1) of IPU 102 (FIG. 1), for example, via an SST 748, which may be, in one example, CommBus/Network interface agnostic.

In some demonstrative aspects, peripheral drivers 715 may provide interface agnostic Application Programming Interfaces (APIs) and/or OS Abstraction Layers (OSAL), for example, such that safety workloads may be adapted from one type of driver/OS to another.

In some demonstrative aspects, FuSa controller 754 may include a discovery safety software/program, for example, to perform one or more safety operations and/or discovery operations, e.g., according to the discovery schemes of FIG. 4 and/or FIG. 5.

In some demonstrative aspects, FuSa controller 754 may capture and/or store an IPU identifier of an IPU, e.g., the identifier of IPU 102 (FIG. 1), for example, once the discovery program discovers a safety-island processor, e.g., safety-island processor 124 (FIG. 1).

In some demonstrative aspects, the IPU identifier may be in a form of a MAC address, an IP address, a CAN-Identifier, and/or the like.

In some demonstrative aspects, the IPU identifier along with one or more terms, e.g., periodicity, SI-IPU protocol, and/or the like, may be programmed into SST 748, for example, to allow SST 748 to send safety and/or critical IO information of a functional processing core 710 to a companion IPU, e.g., IPU 102 (FIG. 1), for example, based on the IPU identifier, e.g., as a destination address.

In some demonstrative aspects, SST 748 may be preprogrammed, or may be programmable with, a unique source identifier, which may be read by the discovery program/software and/or any other safety software component, for example, to pass on to other safety workloads to use as the source address, for example, when sending messages to one or more IPUs.

In some demonstrative aspects, the discovery program may be configured to program/read SST 748, for example, using a simple 2-wire, 3-wire mechanism, e.g., I2C, SPI and/or any other mechanism.

In some demonstrative aspects, FuSa controller 754 may transition the IPU to operation state, and may trigger SST 748 to send, e.g., periodically, an IO status message to the IPU.

In some demonstrative aspects, the IO status message may include a preamble, a source address, which may be pre-programmed in SST 748, a destination address, e.g., address of the IPU, for example, to enable successful routing/destination identification, a workload identifier, e.g., a unique number for SST messages only may be reserved, data, and a packet ending with an integrity check tail.

In other aspects, the IO status message may include any other additional and/or alternative information.

In some demonstrative aspects, FuSa controller 754 may monitor safety signals at a desired periodicity of the functional processing cores 710, and/or SST 748 may send FuSa information to the IPU, e.g., IPU 102 (FIG. 1). For example, these operations may be transparent to the software.

In some demonstrative aspects, the paired IPU, e.g., IPU 102 (FIG. 1), may continue to monitor the health of the companion SoC/platform 725.

In some demonstrative aspects, one or more other safety workloads may use the IPU identifier, which may be obtained during a discovery operation. For example, the IPU identifier may be stored for subsequent use, for example, to register new workloads, to send ODCC snapshots, periodic STLs, and/or the like, to the IPU, for example, to continuously monitor the health of the SoC/platform 725.

In some demonstrative aspects, some or all message exchanges between the SoC, SST 748 and the IPU may be end-to-end protected, for example, with an ability to detect errors in transmission, e.g., on both ends.

In some demonstrative aspects, in case of a Not-OK (NOK), the IPU may send a NOK message to SST 748, to drive OK/NOK pins on the SoC, and/or voltage controller/Safety controller on the platform 725, which may allow the SoC to transition into a safe state.

In some demonstrative aspects, the discovery safety software, e.g., implemented by FuSa Controller 754, may allow to identify an IPU, e.g., IPU 102 (FIG. 1), and to establish a bond, e.g., a FuSa connection, with the IPU, e.g., as described above.

In some demonstrative aspects, the discovery safety software may run once every reboot, or it may be completely dynamic to run based on one or more events.

In one example, the discovery safety software may run once a sensor is added, for example, to identify any available IPUs, and each functional processing core 710 may send their safety workload status to multiple IPUs.

In some demonstrative aspects, this feature of sending safety workload status to multiple IPUs may be implemented to provide a technical solution to enable high availability, for example, to allow dynamic transfer of safety workloads from one IPU to another IPU.

In some demonstrative aspects, the discovery safety software may provide a technical advantage, which may allow ease of maintenance and/or system upgrades.

In some demonstrative aspects, the discovery safety software may allow re-allocation/re-mapping of IPUs and functional safety cores, for example, in case of failure, e.g., on either end, or for any other reason.

In some demonstrative aspects, the discovery safety software may provide a technical advantage for AMRs and AGVs, e.g., having multiple motherboards, which may be exposed to harsh environments, and may otherwise require frequent maintenance.

In some demonstrative aspects, SST 748 and/or communication lines may be replicated with a dual bus/comm channel. For example, SST 748 and/or communication lines may be replicated, for example, using network technologies such as Parallel Redundancy Protocol (PRP) and/or Network Bonding. Accordingly, redundancy may be handled seamlessly, transparent to a software layer. For example, CAN and/or FSoE may inherently provide a safety mechanism for communication with their bus architecture and/or packet protocol, for example, using TSN, e.g., providing 1 Gbps and 2.5 Gbps rates. These network technologies may allow to connect multiple IPUs on a bus, and/or to handle multiple workloads.

Figure 8:
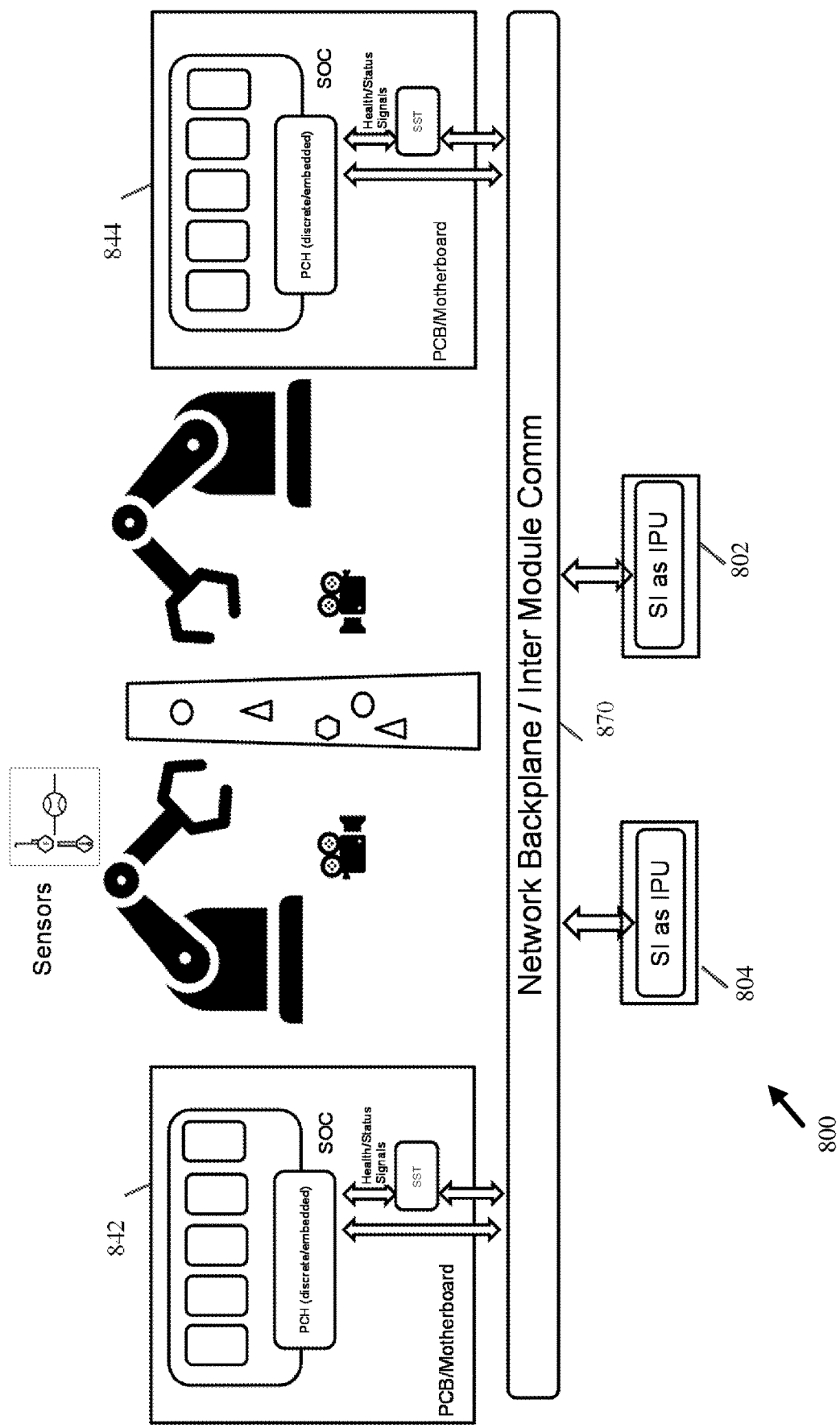
FIG. 8 is a schematic illustration of an industrial robotic system, in accordance with some demonstrative aspects.

Reference is made to FIG. 8, which schematically illustrates an industrial robotic system 800, in accordance with some demonstrative aspects. For example, system 100 (FIG. 1) may include one or more elements of system 800, and/or may perform one or more operations and/or functionalities of system 800.

In one example, industrial robotic system 800 may include an Industrial Discrete Automation system.

In some demonstrative aspects, as shown in FIG. 8, system 800 may include a plurality of motherboards, e.g., including a motherboard 842 and a motherboard 844; and a plurality of IPUs, e.g., including an IPU 802 and an IPU 804. For example, IPU 802 and/or IPU 804 may include one or more elements of IPU 102 (FIG. 1), and/or may perform one or more operations and/or functionalities of IPU 102 (FIG. 1); and/or motherboard 842 and/or motherboard 844 may include one or more elements of motherboard 142 (FIG. 1), and/or may perform one or more operations and/or functionalities of motherboard 142 (FIG. 1).

In some demonstrative aspects, as shown in FIG. 8, the plurality of motherboards may be connected to the plurality of IPUs via a communication interface 870.

In some demonstrative aspects, as shown in FIG. 8, motherboard 842 and/or motherboard 844 may be connected to communication interface 870, and may use IPU 802 and/or IPU 804 as a SI-IPU for safety operations.

In some demonstrative aspects, additional IPCs and/or additional IPUs may be connected to scale the system 800, for example, based on additional compute needs and/or safety needs.

Figure 9:
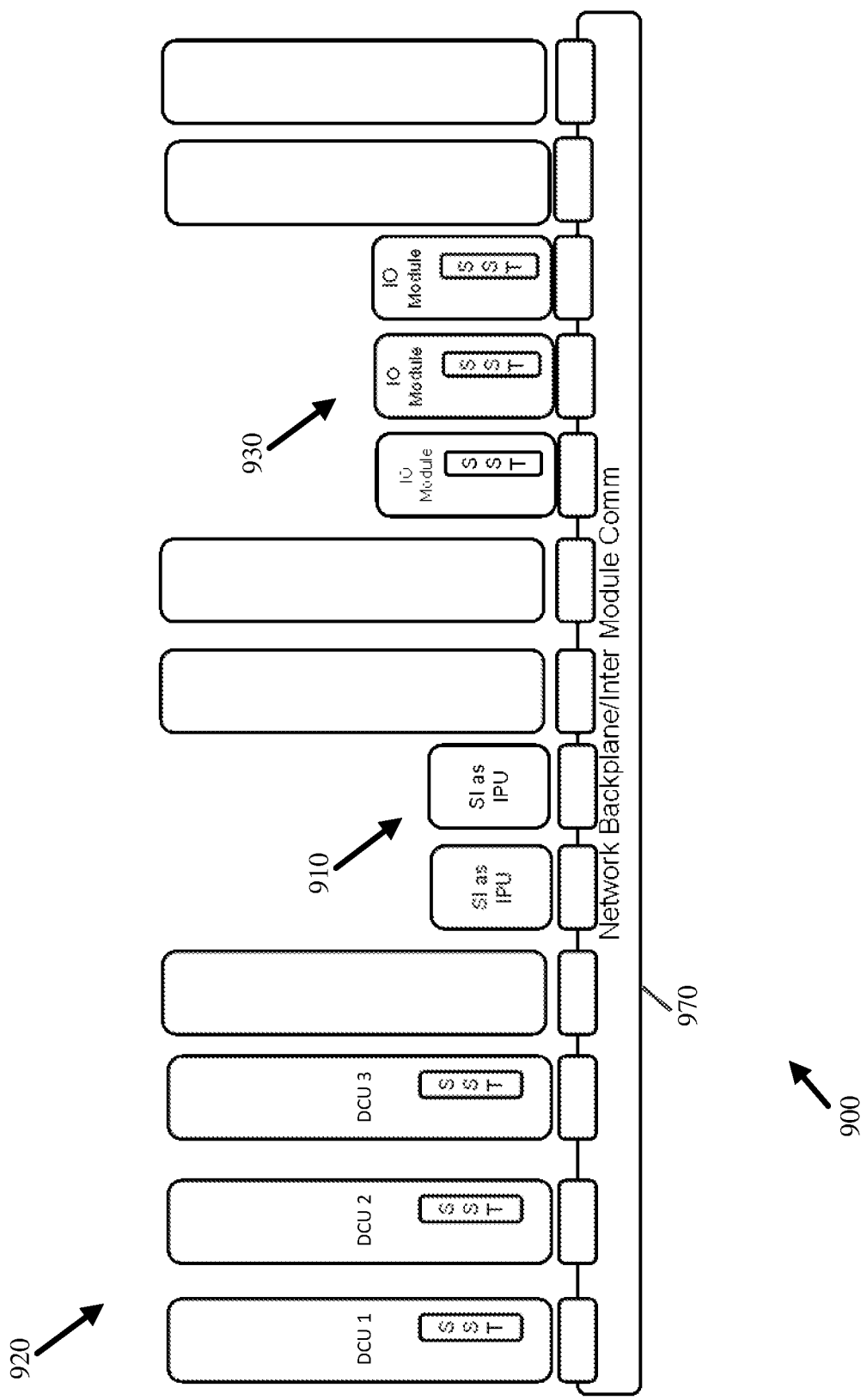
FIG. 9 is a schematic illustration of a process automation system architecture, in accordance with some demonstrative aspects.

Reference is made to FIG. 9, which schematically illustrates a process automation system architecture 900, in accordance with some demonstrative aspects.

In one example, architecture 900 may include a process automation framework, for example, based on an Open Process Automation ('OPA') setup.

In some demonstrative aspects, as shown in FIG. 9, the OPAF setup may include a plurality of pluggable/extendable Distributed Compute Unit (DCU) 920, configured to drive IO in a plurality of IO Modules (IOMs) 930, for example, using a multi-drop-Ethernet or CAN as a communication channel.

In some demonstrative aspects, the DCUs 920 and/or IOMs 930 may be pluggable/removable, for example, based on a need of compute or IO.

In some demonstrative aspects, as shown in FIG. 9, one or more IPUs 910, e.g., including IPU 102 (FIG. 1), may be plugged into a communication interface 970. For example, IPUs 910 may be designed to comply with architecture 900, for example, while addressing safety requirements for compute and/or for one or more IO modules 930. For example, a number of IPUs 910 may be determined, for example, based on a demand, e.g., a number of DCUs 920, a number of IOMs 930, and/or a number of safety workloads.

Figure 10:
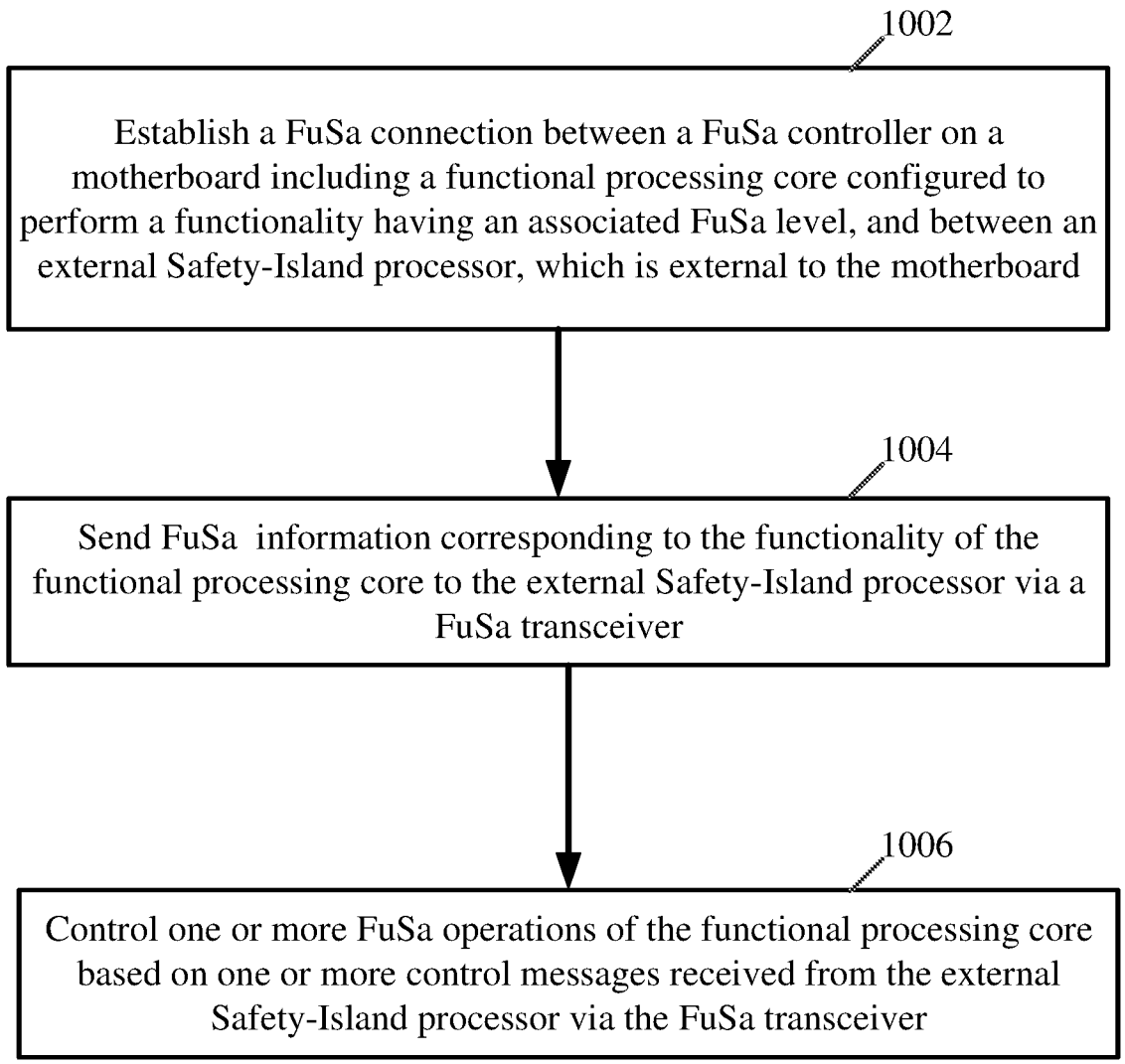
FIG. 10 is a schematic flow-chart illustration of a method of controlling FuSa, in accordance with some demonstrative aspects.

Reference is made to FIG. 10, which schematically illustrates a method of controlling FuSa. For example, one or more of the operations of the method of FIG. 10 may be performed by one or more elements of a system, e.g., system 100 (FIG. 1), for example, one or more computing devices, e.g., computing device 102 (FIG. 1), a motherboard, e.g., motherboard 142 (FIG. 1), a FuSa controller, e.g., a FuSa controller 154 (FIG. 1), a functional processing core, e.g., functional processing core 144 (FIG. 1); and/or a FuSa transceiver, e.g., FuSa transceiver 148 (FIG. 1).

As indicated at block 1002, the method may include establishing a FuSa connection between a FuSa controller on a motherboard including a functional processing core configured to perform a functionality having an associated FuSa level, and between an external safety-island processor, which is external to the motherboard. For example, FuSa controller 154 (FIG. 1) may establish the FuSa connection with the external safety-island processor 124 (FIG. 1), e.g., as described above.

As indicated at block 1004, the method may include sending FuSa information corresponding to the functionality of the functional processing core to the external safety-island processor via a FuSa transceiver. For example, FuSa controller 154 (FIG. 1) may send the FuSa information 155 (FIG. 1) corresponding to the functionality of the functional processing core 144 (FIG. 1) to the external safety-island processor 124 (FIG. 1) via the FuSa transceiver 148 (FIG. 1), e.g., as described above.

As indicated at block 1006, the method may include controlling one or more FuSa operations of the functional processing core based on one or more control messages received from the external safety-island processor via the FuSa transceiver. For example, FuSa controller 154 (FIG. 1) may control the one or more FuSa operations of the functional processing core 144 (FIG. 1) based on the one or more control messages 116 (FIG. 1) received from the external safety-island processor 124 (FIG. 1) via the FuSa transceiver 148 (FIG. 1), e.g., as described above.

Figure 11:
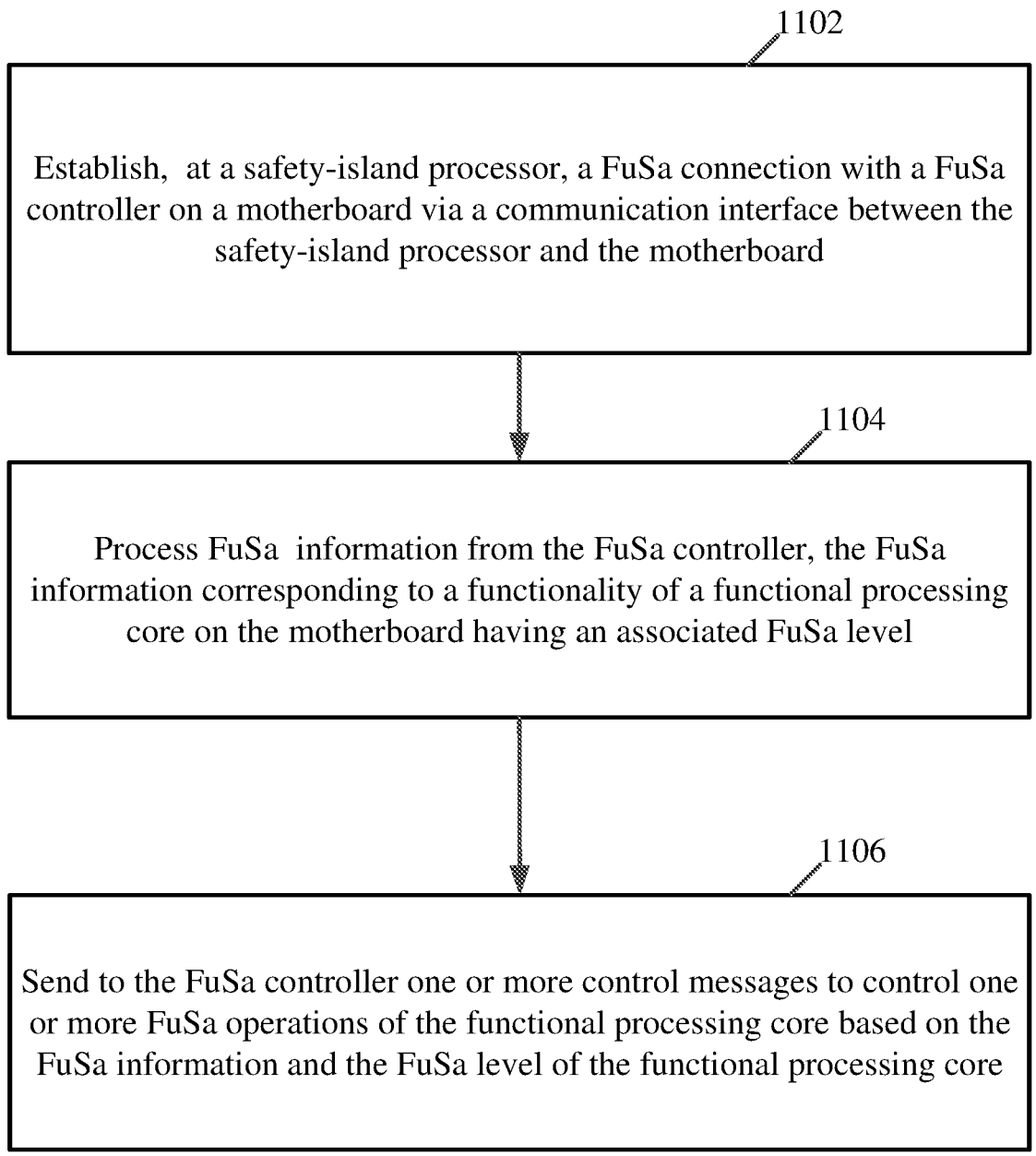
FIG. 11 is a schematic flow-chart illustration of a method of controlling FuSa, in accordance with some demonstrative aspects.

Reference is made to FIG. 11, which schematically illustrates a method of controlling FuSA. For example, one or more of the operations of the method of FIG. 11 may be performed by one or more elements of a system, e.g., system 100 (FIG. 1), for example, one or more IPUs, e.g., IPU 102 (FIG. 1), a safety-island processor, e.g., safety-island processor 124 (FIG. 1), a safety-island controller, e.g., safety-island controller 126 (FIG. 1), and/or a transceiver, e.g., transceiver 114 (FIG. 1).

As indicated at block 1102, the method may include establishing, at a safety-island processor, a FuSa connection with a FuSa controller on a motherboard via a communication interface between the safety-island processor and the motherboard. For example, safety-island controller 126 (FIG. 1) may establish the FuSa connection with the FuSa controller 154 (FIG. 1) on the motherboard 142 (FIG. 1), e.g., as described above.

As indicated at block 1104, the method may include processing FuSa information from the FuSa controller, the FuSa information corresponding to a functionality of a functional processing core on the motherboard having a FuSa level. For example, safety-island controller 126 (FIG. 1) may process the FuSa information 115 (FIG. 1) from the FuSa controller 154 (FIG. 1), the FuSa information 115 (FIG. 1) corresponding to the functionality of the functional processing core 144 (FIG. 1) on the motherboard 142 (FIG. 1), e.g., as described above.

As indicated at block 1106, the method may include sending to the FuSa controller one or more control messages to control one or more FuSa operations of the functional processing core based on the FuSa information. For example, safety-island controller 126 (FIG. 1) may send to the FuSa controller 154 (FIG. 1) the one or more control messages 116 (FIG. 1) to control the one or more FuSa operations of the functional processing core 144 (FIG. 1) based on the FuSa information 115 (FIG. 1), e.g., as described above.

Figure 12:
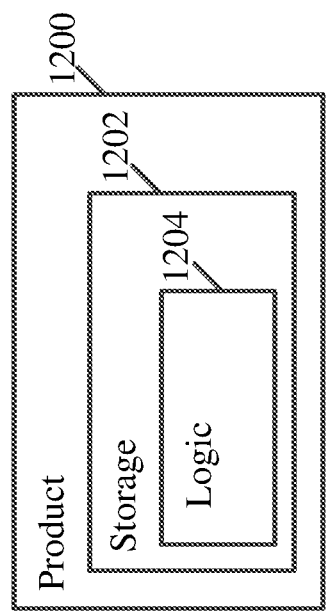
FIG. 12 is a schematic illustration of a product of manufacture, in accordance with some demonstrative aspects.

Reference is made to FIG. 12, which schematically illustrates a product of manufacture 1200, in accordance with some demonstrative aspects. Product 1200 may include one or more tangible computer-readable ("machine-readable") non-transitory storage media 1202, which may include computer-executable instructions, e.g., implemented by logic 1204, operable to, when executed by at least one computer processor, enable the at least one computer processor to implement one or more operations at computing device 140 (FIG. 1), motherboard 142 (FIG. 1), FuSa controller 154 (FIG. 1), FuSa transceiver 148 (FIG. 1), IPU 102 (FIG. 1), safety-island processor 124 (FIG. 1), safety-island controller 126 (FIG. 1), and/or transceiver 114 (FIG. 1); to cause computing device 140 (FIG. 1), motherboard 142 (FIG. 1), FuSa controller 154 (FIG. 1), FuSa transceiver 148 (FIG. 1), IPU 102 (FIG. 1), safety-island processor 124 (FIG. 1), safety-island controller 126 (FIG. 1), and/or transceiver 114 (FIG. 1) to perform, trigger and/or implement one or more operations and/or functionalities; and/or to perform, trigger and/or implement one or more operations and/or functionalities described with reference to the FIGS. 1-11, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 1200 and/or machine-readable storage media 1202 may include one or more types of computer-readable storage media capable of storing data, including volatile memory, non-volatile memory, removable or non-removable memory, erasable or non-erasable memory, writeable or re-writeable memory, and the like. For example, machine-readable storage media 1202 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), flash memory (e.g., NOR or NAND flash memory), content addressable memory (CAM), polymer memory, phase-change memory, ferroelectric memory, silicon-oxide-nitride-oxide-silicon (SONOS) memory, a disk, a hard drive, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 1204 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 1204 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, machine code, and the like.

EXAMPLES

The following examples pertain to further aspects.

Example 1 includes an apparatus comprising a motherboard comprising a functional processing core configured to perform a functionality having a Functional Safety (FuSa) level; a FuSa transceiver configured to communicate with an external safety-island processor, which is external to the motherboard; and a FuSa controller configured to establish a FuSa connection with the external safety-island processor according to the FuSa level, to send FuSa information corresponding to the functionality of the functional processing core to the external safety-island processor via the FuSa transceiver, and to control one or more FuSa operations of the functional processing core based on one or more control messages received from the external safety-island processor via the FuSa transceiver.

Example 2 includes the subject matter of Example 1, and optionally, wherein the FuSa controller is configured to initiate a discovery operation to discover one or more external safety-island processors, and to establish the FuSa connection with a discovered external safety-island processor.

Example 3 includes the subject matter of Example 2, and optionally, wherein the FuSa controller is configured to initiate the discovery operation based on a reboot of the functional processing core.

Example 4 includes the subject matter of Example 2 or 3, and optionally, wherein the FuSa controller is configured to initiate the discovery operation based on a change in the functionality of the functional processing core.

Example 5 includes the subject matter of any one of Examples 2-4, and optionally, wherein the FuSa controller is configured to initiate the discovery operation during a first FuSa connection with a first external safety-island processor, and, based on the discovery operation, to establish a second FuSa connection with a second external safety-island processor.

Example 6 includes the subject matter of any one of Examples 2-5, and optionally, wherein the discovery operation comprises transmission of a discovery message by the FuSa controller via the FuSa transceiver.

Example 7 includes the subject matter of any one of Examples 2-6, and optionally, wherein the FuSa controller is configured to discover one or more external safety-island processors based on one or more publish messages from the one or more external safety-island processors.

Example 8 includes the subject matter of any one of Examples 1-7, and optionally, wherein the FuSa controller is configured to process FuSa capability information in a message from a discovered external safety-island processor, the FuSa capability information to indicate a FuSa capability of the discovered external safety-island processor, wherein the FuSa controller is configured to select whether to establish the FuSa connection with the discovered external safety-island processor based on the FuSa capability information.

Example 9 includes the subject matter of Example 8, and optionally, wherein the FuSa controller is configured to cause the FuSa transceiver to transmit a discovery message, wherein the message from the discovered external safety-island processor is based on the discovery message.

Example 10 includes the subject matter of Example 8 or 9, and optionally, wherein the FuSa capability information comprises compute capability information to indicate a count of simultaneous FuSa workloads supported by the discovered external safety-island processor.

Example 11 includes the subject matter of any one of Examples 8-10, and optionally, wherein the FuSa capability information comprises time information to indicate a safety loop time supported by the discovered external safety-island processor.

Example 12 includes the subject matter of any one of Examples 8-11, and optionally, wherein the FuSa capability information comprises safety capability information to indicate one or more safety capability attributes supported by the discovered external safety-island.

Example 13 includes the subject matter of Examples 1-12, and optionally, wherein the FuSa controller is configured to negotiate a setup of the FuSa connection with the external safety-island processor based on one or more negotiation messages.

Example 14 includes the subject matter of Examples 1-13, and optionally, wherein the FuSa controller is configured to negotiate a setup of the FuSa connection with the external safety-island processor based on an exchange of a first message from the FuSa controller and a second message from the safety-island processor, the first message comprising required term information to indicate one or more required terms for the FuSa connection, the second message comprising a commit indication to indicate whether the safety-island processor is to commit to the one or more required terms.

Example 15 includes the subject matter of any one of Examples 1-14, and optionally, wherein the FuSa controller is configured to switch from a first FuSa connection with a first external safety-island processor to a second FuSa connection with a second external safety-island processor.

Example 16 includes the subject matter of any one of Examples 1-15, and optionally, wherein the FuSa controller is configured to simultaneously maintain a first FuSa connection with a first external safety-island processor and a second FuSa connection with a second external safety-island processor.

Example 17 includes the subject matter of Example 16, and optionally, wherein the FuSa controller is configured to send first FuSa information corresponding to the functionality of the functional processing core to the first external safety-island processor, to send second FuSa information corresponding to the functionality of the functional processing core to the second external safety-island processor, and to control the one or more FuSa operations of the functional processing core based on a first control message from the first external safety-island processor and a second control message from the second external safety-island processor.

Example 18 includes the subject matter of Examples 1-17, and optionally, wherein the FuSa controller is configured to initiate transition of the functional processing core to a safe state based on an identified disconnection event indicating a potential disconnection of the FuSa connection with the external safety-island processor.

Example 19 includes the subject matter of any one of Examples 1-18, and optionally, wherein the FuSa controller is configured to periodically send the FuSa information to the external safety-island processor at a periodicity based on a FuSa attribute of the functional processing core.

Example 20 includes the subject matter of any one of Examples 1-19, and optionally, wherein the control messages from the external safety-island processor comprise a safety command to initiate transition of the functional processing core to a safe state.

Example 21 includes the subject matter of any one of Examples 1-20, and optionally, wherein the FuSa information from the functional processing core comprises at least one of safety workload information, safety integrity information, software fault information, or runtime verification information.

Example 22 includes the subject matter of any one of Examples 1-21, and optionally, wherein the FuSa information from the functional processing core comprises at least one of Periodic health check library result information, or Temporal and Logical monitor (TLM) result information.

Example 23 includes the subject matter of any one of Examples 1-22, and optionally, wherein the FuSa transceiver comprises a serializer/de-serializer configured to serialize a plurality of transmitted streams into a transmitted serial transmission, and to de-serialize a received serialized transmission into a plurality of received streams.

Example 24 includes the subject matter of any one of Examples 1-23, and optionally, comprising the external safety-island processor.

Example 25 includes the subject matter of Example 24, and optionally, comprising an Infrastructure Processing Unit (IPU) configured as the external safety-island processor.

Example 26 includes the subject matter of Example 24 or 25, and optionally, comprising a plurality of motherboards, wherein a first motherboard of the plurality of motherboards comprises a first FuSa controller, and a second motherboard of the plurality of motherboards comprises a second FuSa controller.

Example 27 includes the subject matter of any one of Examples 24-26, and optionally, comprising a plurality of external safety-island processors.

Example 28 includes an apparatus comprising a safety-island processor comprising a transceiver configured to communicate over a communication interface between the safety-island processor and a motherboard; and a safety-island controller configured to establish a Functional Safety (FuSa) connection with a FuSa controller on the motherboard, wherein the safety-island controller is configured to process FuSa information from the FuSa controller, the FuSa information corresponding to a functionality of a functional processing core on the motherboard having a FuSa level, wherein the safety-island controller is configured to send to the FuSa controller one or more control messages to control one or more FuSa operations of the functional processing core based on the FuSa information and the FuSa level of the functional processing core.

Example 29 includes the subject matter of Example 28, and optionally, wherein the safety-island controller is configured to transmit a publish message via the transceiver, the publish message comprising capability information to indicate a FuSa capability of the safety-island processor.

Example 30 includes the subject matter of Example 29, and optionally, wherein the safety-island controller is configured to transmit the publish message based on a discovery message from the FuSa controller.

Example 31 includes the subject matter of Example 29 or 30, and optionally, wherein the safety-island controller is configured to periodically transmit the publish message.

Example 32 includes the subject matter of any one of Examples 29-31, and optionally, wherein the FuSa capability information comprises compute capability information to indicate a count of simultaneous FuSa workloads supported by the safety-island processor.

Example 33 includes the subject matter of any one of Examples 29-32, and optionally, wherein the FuSa capability information comprises time information to indicate a safety loop time supported by the safety-island processor.

Example 34 includes the subject matter of any one of Examples 29-33, and optionally, wherein the FuSa capability information comprises safety capability information to indicate one or more safety capability attributes supported by the safety-island processor.

Example 35 includes the subject matter of any one of Examples 28-34, and optionally, wherein the safety-island controller is configured to periodically monitor a functional health of the functional processing core based on the FuSa information.

Example 36 includes the subject matter of Examples 28-35, and optionally, wherein the safety-island controller is configured to negotiate a setup of the FuSa connection with the FuSa controller.

Example 37 includes the subject matter of Examples 28-36, and optionally, wherein the safety-island controller is configured to negotiate a setup of the FuSa connection with the FuSa controller based on an exchange of a first message from the FuSa controller and a second message from the safety-island processor, the first message comprising required term information to indicate one or more required terms for the FuSa connection, the second message comprising a commit indication to indicate whether the safety-island processor is to commit to the one or more required terms.

Example 38 includes the subject matter of any one of Examples 28-37, and optionally, wherein the safety-island controller is configured to simultaneously maintain a first FuSa connection with a first FuSa controller of a first motherboard and a second FuSa connection with a second FuSa controller of a second motherboard.

Example 39 includes the subject matter of Example 38, and optionally, wherein the safety-island controller is configured to process first FuSa information from the first FuSa controller corresponding to functionality of a functional processing core of the first motherboard, to send to the first FuSa controller a first control message based on the first FuSa information, to process second FuSa information from the second FuSa controller corresponding to functionality of a functional processing core of the second motherboard, and to send to the second FuSa controller a second control message based on the second FuSa information.

Example 40 includes the subject matter of any one of Examples 28-39, and optionally, wherein the one or more control messages comprise a safety command to initiate transition of the functional processing core to a safe state.

Example 41 includes the subject matter of any one of Examples 28-40, and optionally, wherein the FuSa information from the FuSa controller comprises at least one of safety workload information, safety integrity information, software fault information, or runtime verification information.

Example 42 includes the subject matter of any one of Examples 28-41, and optionally, wherein the FuSa information from the FuSa controller comprises at least one of Periodic health check library result information, or Temporal and Logical monitor (TLM) result information.

Example 43 includes the subject matter of any one of Examples 28-42, and optionally, comprising an Infrastructure Processing Unit (IPU) comprising the safety-island processor.

Example 44 includes the subject matter of any one of Examples 28-43, and optionally, comprising the motherboard.

Example 45 includes the subject matter of any one of Examples 28-44, and optionally, comprising a plurality of motherboards, wherein a first motherboard of the plurality of motherboards comprises a first FuSa controller, and a second motherboard of the plurality of motherboards comprises a second FuSa controller.

Example 46 includes the subject matter of any one of Examples 28-45, and optionally, comprising a plurality of safety-island processors.

Example 47 comprises a computing device comprising the apparatus of any one of Examples 1-46.

Example 48 comprises an apparatus comprising means for executing any of the described operations of Examples 1-46.

Example 49 comprises a product comprising one or more tangible computer-readable non-transitory storage media comprising computer-executable instructions operable to, when executed by at least one processor, enable the at least one processor to cause a device to perform any of the described operations of Examples 1-46.

Example 50 comprises an apparatus comprising: a memory interface; and processing circuitry configured to: perform any of the described operations of Examples 1-46.

Example 51 comprises a method comprising any of the described operations of Examples 1-46.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
 a motherboard comprising:
  a functional processing core configured to perform a functionality having a Functional Safety (FuSa) level;
  a FuSa transceiver configured to communicate with an external safety-island processor, which is external to the motherboard; and
  a FuSa controller configured to establish a FuSa connection with the external safety-island processor according to the FuSa level, to send FuSa information corresponding to the functionality of the functional processing core to the external safety-island processor via the FuSa transceiver, and to control one or more FuSa operations of the functional processing core based on one or more control messages received from the external safety-island processor via the FuSa transceiver, wherein the FuSa controller is configured to process FuSa capability information in a message from a discovered external safety-island processor, the FuSa capability information to indicate a FuSa capability of the discovered external safety-island processor, wherein the FuSa controller is configured to select whether to establish the FuSa connection with the discovered external safety-island processor based on the FuSa capability information.

2. The apparatus of claim 1, wherein the FuSa controller is configured to initiate a discovery operation to discover one or more external safety-island processors.

3. The apparatus of claim 2, wherein the FuSa controller is configured to initiate the discovery operation during a first FuSa connection with a first external safety-island processor, and, based on the discovery operation, to establish a second FuSa connection with a second external safety-island processor.

4. The apparatus of claim 2, wherein the FuSa controller is configured to discover the one or more external safety-island processors based on one or more publish messages from the one or more external safety-island processors.

5. The apparatus of claim 1, wherein the FuSa capability information comprises compute capability information to indicate a count of simultaneous FuSa workloads supported by the discovered external safety-island processor.

6. The apparatus of claim 1, wherein the FuSa capability information comprises safety capability information to indicate one or more safety capability attributes supported by the discovered external safety-island.

7. The apparatus of claim 1, wherein the FuSa controller is configured to negotiate a setup of the FuSa connection with the external safety-island processor based on one or more negotiation messages.

8. The apparatus of claim 1, wherein the FuSa controller is configured to negotiate a setup of the FuSa connection with the external safety-island processor based on an exchange of a first message from the FuSa controller and a second message from the external safety-island processor, the first message comprising required term information to indicate one or more required terms for the FuSa connection, the second message comprising a commit indication to indicate whether the external safety-island processor is to commit to the one or more required terms.

9. The apparatus of claim 1, wherein the FuSa controller is configured to simultaneously maintain a first FuSa connection with a first external safety-island processor and a second FuSa connection with a second external safety-island processor.

10. The apparatus of claim 9, wherein the FuSa controller is configured to send first FuSa information corresponding to the functionality of the functional processing core to the first external safety-island processor, to send second FuSa information corresponding to the functionality of the functional processing core to the second external safety-island processor, and to control the one or more FuSa operations of the functional processing core based on a first control message from the first external safety-island processor and a second control message from the second external safety-island processor.

11. The apparatus of claim 1, wherein the FuSa controller is configured to initiate transition of the functional processing core to a safe state based on an identified disconnection event indicating a potential disconnection of the FuSa connection with the external safety-island processor.

12. The apparatus of claim 1, wherein the FuSa information corresponding to the functionality of the functional processing core comprises at least one of safety workload information, safety integrity information, software fault information, or runtime verification information.

13. The apparatus of claim 1 comprising the external safety-island processor.

14. The apparatus of claim 1 comprising a plurality of motherboards, wherein a first motherboard of the plurality of motherboards comprises a first FuSa controller, and a second motherboard of the plurality of motherboards comprises a second FuSa controller.

15. An apparatus comprising:
a safety-island processor comprising:
a transceiver configured to communicate over a communication interface between the safety-island processor and one or more motherboards; and
a safety-island controller configured to simultaneously maintain a first Functional Safety (FuSa) connection with a first FuSa controller on a first motherboard and a second FuSa connection with a second FuSa controller on a second motherboard, wherein the safety-island controller is configured to process first FuSa information from the first FuSa controller, the first FuSa information corresponding to a functionality of a functional processing core on the first motherboard having a FuSa level, wherein the safety-island controller is configured to send to the first FuSa controller one or more first control messages to control one or more FuSa operations of the functional processing core on the first motherboard based on the first FuSa information and the FuSa level of the functional processing core on the first motherboard, wherein the safety-island controller is configured to process second FuSa information from the second FuSa controller corresponding to a functionality of a functional processing core on the second motherboard, and to send to the second FuSa controller a second control message based on the second FuSa information.

16. The apparatus of claim 15, wherein the safety-island controller is configured to transmit a publish message via the transceiver, the publish message comprising capability information to indicate a FuSa capability of the safety-island processor.

17. The apparatus of claim 15, wherein the safety-island controller is configured to negotiate a setup of the FuSa connection with the first FuSa controller.

18. The apparatus of claim 15, wherein the one or more first control messages comprises a safety command to initiate transition of the functional processing core on the first motherboard to a safe state.

19. The apparatus of claim 15, wherein the safety-island controller is configured to send to the first FuSa controller an error message to indicate an error detected based on the first FuSa information.

20. The apparatus of claim 15 comprising an Infrastructure Processing Unit (IPU) comprising the safety-island processor.

21. A product comprising one or more tangible computer-readable non-transitory storage media comprising computer-executable instructions operable to, when executed by at least one processor, enable the at least one processor to cause a safety-island processor to:
establish a first Functional Safety (FuSa) connection with a first FuSa controller on a first motherboard via a communication interface between the safety-island processor and the first motherboard;
process first FuSa information from the first FuSa controller, the first FuSa information corresponding to a functionality of a functional processing core on the first motherboard having an associated FuSa level;
send to the first FuSa controller one or more first control messages to control one or more FuSa operations of the functional processing core on the first motherboard based on the first FuSa information and the FuSa level of the functional processing core on the first motherboard;

maintain a second FuSa connection with a second FuSa controller on a second motherboard simultaneously with the first FuSa connection;

process second FuSa information from the second FuSa controller corresponding to a functionality of a functional processing core on the second motherboard; and send to the second FuSa controller a second control message based on the second FuSa information.

22. The product of claim 21, wherein the one or more first control messages comprises a safety command to initiate transition of the functional processing core on the first motherboard to a safe state.

* * * * *